(12) United States Patent
Martin et al.

(10) Patent No.: US 9,244,618 B1
(45) Date of Patent: Jan. 26, 2016

(54) TECHNIQUES FOR STORING DATA ON DISK DRIVES PARTITIONED INTO TWO REGIONS

(71) Applicant: EMC Corporation, Hopkinton, MA (US)

(72) Inventors: Owen Martin, Hopedale, MA (US); Sachin More, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/612,681

(22) Filed: Feb. 3, 2015

Related U.S. Application Data

(63) Continuation of application No. 14/038,024, filed on Sep. 26, 2013, now Pat. No. 8,976,636.

(51) Int. Cl.
*G06F 3/06* (2006.01)

(52) U.S. Cl.
CPC ............ *G06F 3/0611* (2013.01); *G06F 3/0644* (2013.01); *G06F 3/0689* (2013.01); *G06F 2003/0692* (2013.01)

(58) Field of Classification Search
None
See application file for complete search history.

(56) References Cited

U.S. PATENT DOCUMENTS

| 5,764,945 | A  | * | 6/1998  | Ballard           | 711/113 |
|-----------|----|---|---------|-------------------|---------|
| 6,671,772 | B1 | * | 12/2003 | Cousins           | 711/112 |
| 6,925,529 | B2 | * | 8/2005  | Bohrer et al.     | 711/114 |
| 7,551,383 | B1 | * | 6/2009  | Kupferman         | 360/67  |
| 2002/0186492 | A1 | * | 12/2002 | Smith           | 360/69  |
| 2006/0161678 | A1 | * | 7/2006  | Bopardikar et al. | 709/238 |
| 2008/0028142 | A1 | * | 1/2008  | Kleinschmidt et al. | 711/112 |
| 2008/0091877 | A1 | * | 4/2008  | Klemm et al.    | 711/114 |
| 2011/0026852 | A1 | * | 2/2011  | Austin et al.   | 382/305 |
| 2011/0138148 | A1 | * | 6/2011  | Friedman et al. | 711/173 |

* cited by examiner

*Primary Examiner* — Paul Huber
(74) *Attorney, Agent, or Firm* — Muirhead and Saturnelli, LLC

(57) ABSTRACT

Described are techniques for storing data on disk drives. Each disk drive platter of each of the disk drives is partitioned into two separate regions whereby a pivot point denoting a radial distance from the center of each disk drive platter is a boundary partitioning each disk drive platter into the two separate regions. A data portion is classified in accordance with an expected activity level of the data portion. Storage is allocated for the data portion in one of the two separate regions of one of the disk drive platters of one of the disk drives in accordance with the expected activity level of the data portion and a defined allocation flow.

21 Claims, 34 Drawing Sheets

TECHNIQUES FOR STORING DATA ON DISK DRIVES PARTITIONED INTO TWO REGIONS

RELATED APPLICATIONS

This application is a continuation of U.S. patent application Ser. No. 14/038,024 (pending), filed on Sep. 26, 2013, entitled TECHNIQUES FOR STORING DATA ON DISK DRIVES PARTITIONED INTO TWO REGIONS, which is incorporated by reference herein in its entirety.

BACKGROUND

1. Technical Field

This application generally relates to data storage and more particularly to techniques for storing data on physical storage devices.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the data storage system directly, but rather, access what appears to the host systems as a plurality of logical units, logical devices or logical volumes. The logical units may or may not correspond to the actual physical disk drives. Allowing multiple host systems to access the single data storage system allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

SUMMARY OF THE INVENTION

In accordance with one aspect of the invention is a method of storing data on disk drives comprising: partitioning each disk drive platter of each of the disk drives into two separate regions whereby a pivot point denoting a radial distance from the center of said each disk drive platter is a boundary partitioning said each disk drive platter into the two separate regions; classifying a data portion in accordance with an expected activity level of said data portion; and allocating storage for the data portion in one of the two separate regions of one of the disk drive platters of one of the disk drives in accordance with the expected activity level of said data portion and a defined allocation flow. A first of the two separate regions may include an ideal region corresponding to an inner portion of said each disk drive platter spanning from an innermost cylinder of said each disk drive platter closest to a center of said each disk drive platter to the radial distance from the center of said each disk drive platter denoted by the pivot point. A second of the two separate regions may include an idle region corresponding to an outer portion of said each disk drive platter spanning from the radial distance from the center of said each disk drive platter denoted by the pivot point to an outermost cylinder of said each disk drive platter. The pivot point may be selected such that approximately 40% of total storage capacity of said each disk drive platter is included in said ideal region and a remaining portion of the total storage capacity of said each disk drive platter is included in said idle region. The defined allocation flow for allocating storage from the ideal region may allocate available storage from a physical location in the ideal region which is closest to the pivot point. The defined allocation flow for allocating storage from the idle region may allocate available storage from a physical location in the idle region which is closest to the pivot point. The data portion may be classified in the classifying step as having an expected activity level that is any of active, idle and unknown. If the data portion is classified as having an expected activity level that is idle, storage for the data portion may be allocated from the idle region. If the data portion is classified as having an expected activity level other than idle, storage for the data portion may be allocated from the ideal region. The data portion may be included in a virtually provisioned logical device. Allocating storage for the data portion may be performed responsive to performing a write operation to write the data portion. The data portion may be currently stored on a first of the disk drives of a first storage tier and allocating storage for the data portion may be performed responsive to promoting the data portion from the first storage tier to a second storage tier having a relative performance classification that is higher than the first storage tier, wherein the one of the disk drives from which storage is allocated for the data portion may be included in the second storage tier. The data portion may be currently stored on a first of the disk drives of a first storage tier and allocating storage for the data portion may be performed responsive to demoting the data portion from the first storage tier to a second storage tier having a relative performance classification that is lower than the first storage tier, wherein said one of the disk drives from which storage is allocated for the data portion may be included in the second storage tier. The data portion may be included in a virtually provisioned logical device having a logical address space that is divided into a plurality of partitions. Each of the partitions may have a corresponding subrange of the logical address space. The data portion may be data stored at a logical address included in a first of the plurality of subranges mapped to a first of the plurality of partitions. Each of the plurality of partitions may be associated with a different one of a plurality of idle time counters. Classifying may be performed in accordance with one of the plurality of idle time counters associated with the first partition including the data portion. If an I/O (input/output) operation is directed to one of the plurality of partitions, a first of the plurality of idle time counters associated with said one partition may be initialized to zero (0), and wherein a background process may periodically perform processing to increment each of the plurality of idle time counters associated with a different one of the plurality of partitions. An idle time threshold may indicate a minimum amount of time that elapses without having an I/O operation directed to a partition for data of the partition to be classified as idle, and wherein said classifying may classify the data portion as idle if said one idle time counter associated with the first partition including the data portion denotes an amount of time equal to or larger than the idle time threshold. The data portion may be classified as active if said one idle time counter associated with the first partition including the data portion denotes an amount of time less than then idle time threshold. The data portion may be classified as unknown if an insufficient amount of time has elapsed to determine whether the data portion is idle or active. A storage pool may be configured to include one or more of the disk drives, and the method may further comprise performing first processing responsive to an occurrence of a trigger event. The first processing may include performing processing to migrate one or more data portions currently having storage allocated in the ideal region of a disk drive of the storage pool to an idle region of a disk drive of the storage pool, wherein said one or more data portions are classified as idle. A storage pool may be configured to include one or more of the disk drives, and the method may further comprise performing first processing responsive to an average response time for I/O operations directed to said storage pool exceeding a threshold average response time. The first processing may include receiving a read operation to read data from a first logical device, wherein the first logical address is mapped to physical storage provisioned from the storage pool, wherein said read operation results in a read miss whereby not all data requested by the read operation is included in a cache and servicing the read operation includes retrieving at least some data from a disk drive of the storage pool; responsive to said read miss, accessing the disk drive of the storage pool to retrieve said at least some data from the disk drive of the storage pool needed to service the read operation and also prefetching additional data from the disk drive of the storage pool, wherein said at least some data is located at a first logical address range portion of the first logical device and said additional data is located at a second logical address range portion of the first logical device that sequentially follows said first logical address range portion, wherein said at least some data and said additional data are located in the idle region of the disk drive; storing the at least some data and said additional data in the cache; while said at least some data and said additional data are in cache for a time period, determining a number of I/O operations directed to any of the first logical address range portion and the second logical address range portion, said number of I/O operations denoting a number of cache hits for the first logical address range portion in combination with the second logical address range portion; and if the number of I/O operations denoting a number of cache hits is greater than one, moving said at least some data and said additional data from the idle region of the disk drive of the storage pool to an active region of a second disk drive of a second storage pool, wherein said disk drive is included in a first storage tier that is a lower performance storage tier than a second storage tier including the second disk drive.

In accordance with another aspect of the invention is a data storage system comprising: a plurality of disk drives, wherein each disk drive platter of each of the disk drives is partitioned into two separate regions whereby a pivot point denoting a radial distance from the center of said each disk drive platter is a boundary partitioning said each disk drive platter into the two separate regions; a first storage pool including a first portion of the disk drives of a first storage tier; classifying the data portion in accordance with an expected activity level of said data portion; and allocating storage for the data portion from a first of the disk drives of the first storage pool, wherein said allocating allocates storage for the data portion in one of the two separate regions of a disk drive platter of the first disk drive in accordance with the expected activity level of said data portion and a defined allocation flow.

In accordance with another aspect of the invention is a computer readable medium comprising code stored thereon for storing data on disk drives, the computer readable medium comprising code for: partitioning each disk drive platter of each of the disk drives into two separate regions whereby a pivot point denoting a radial distance from the center of said each disk drive platter is a boundary partitioning said each disk drive platter into the two separate regions; classifying a data portion in accordance with an expected activity level of said data portion; and allocating storage for the data portion in one of the two separate regions of one of the disk drive platters of one of the disk drives in accordance with the expected activity level of said data portion and a defined allocation flow.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
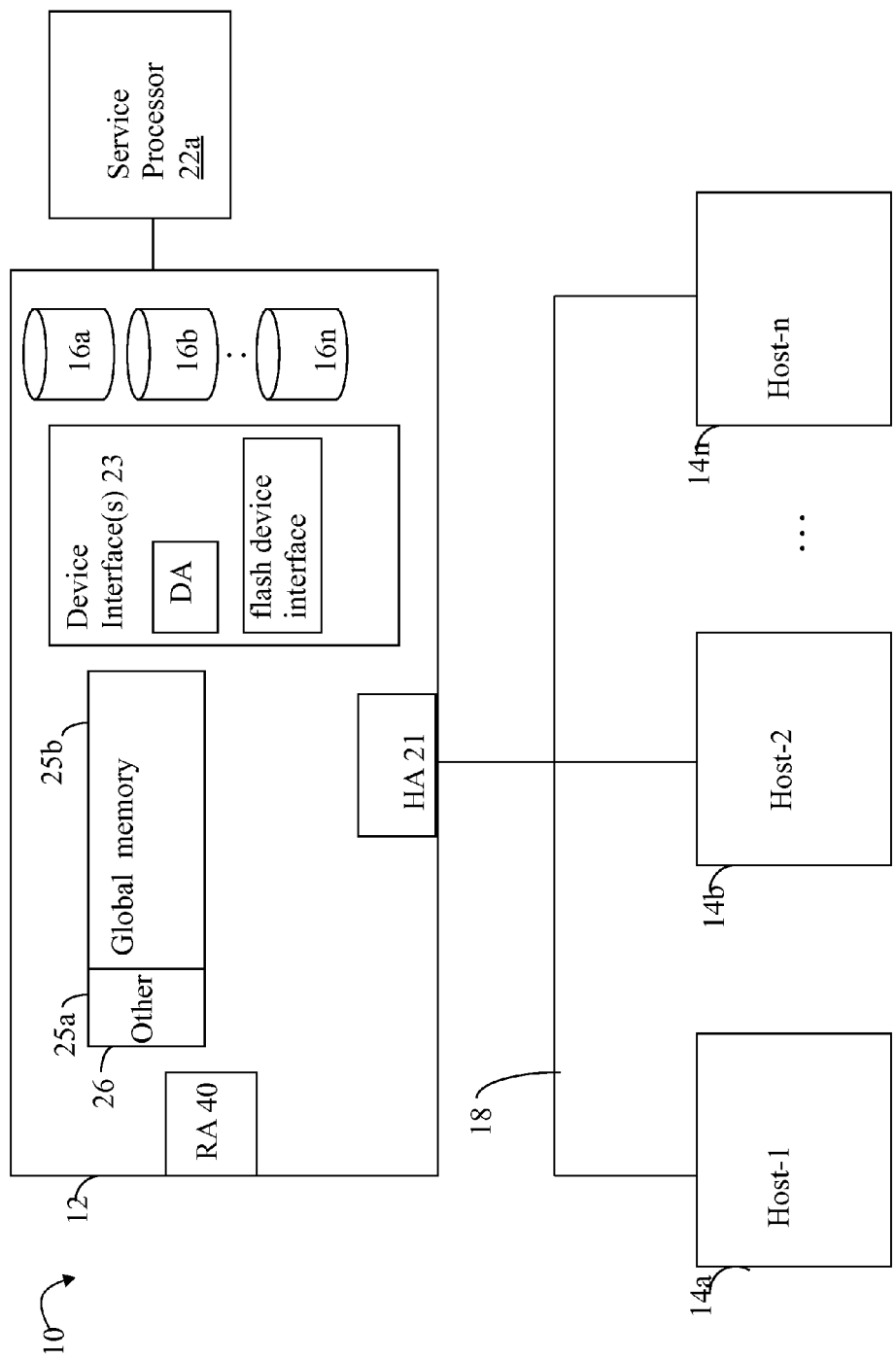
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Alternatively, an embodiment may provide for collection of such performance data using processor(s) and other components which are internal to the data storage system.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing described herein in following paragraphs as well other suitable processing.

Figure 2:
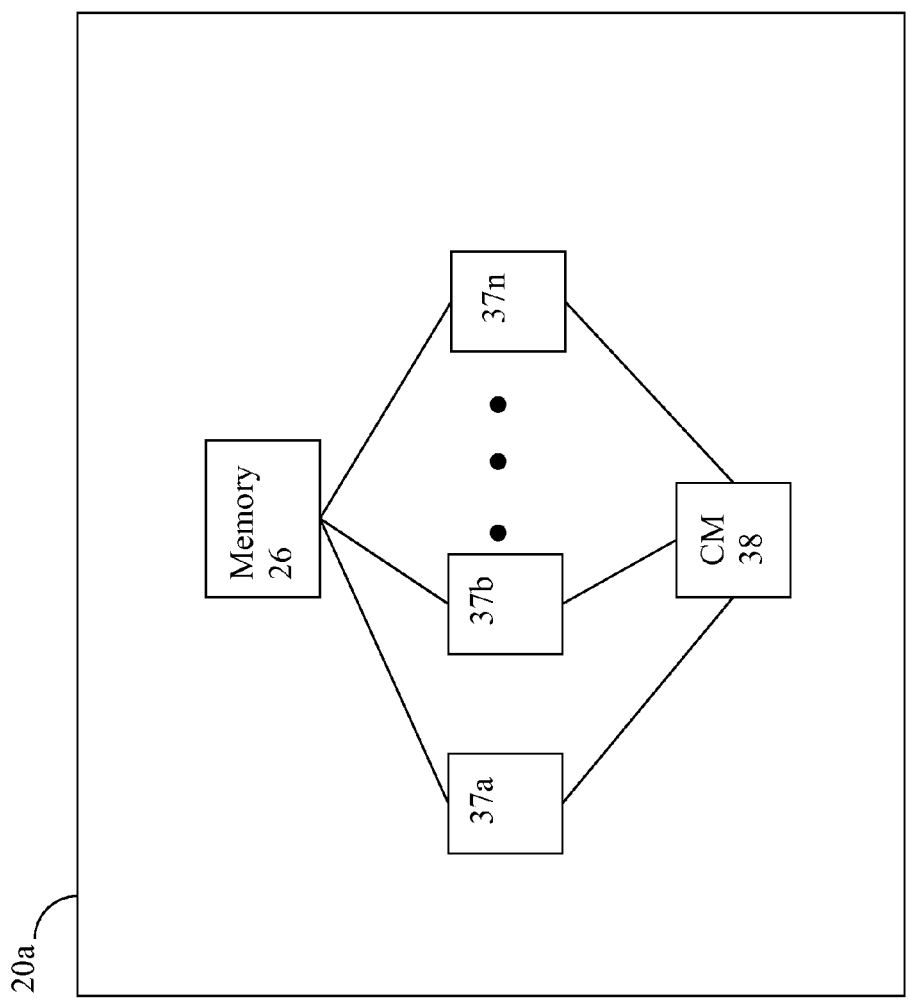
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ or VMAX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC disk drive, a SATA (Serial Advanced Technology Attachment) drive), and the like. Data protection may specify a type or level of data storage protection such, for example, as a particular RAID level (e.g., RAID1, RAID-5 3+1, RAID5 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

Figure 3:
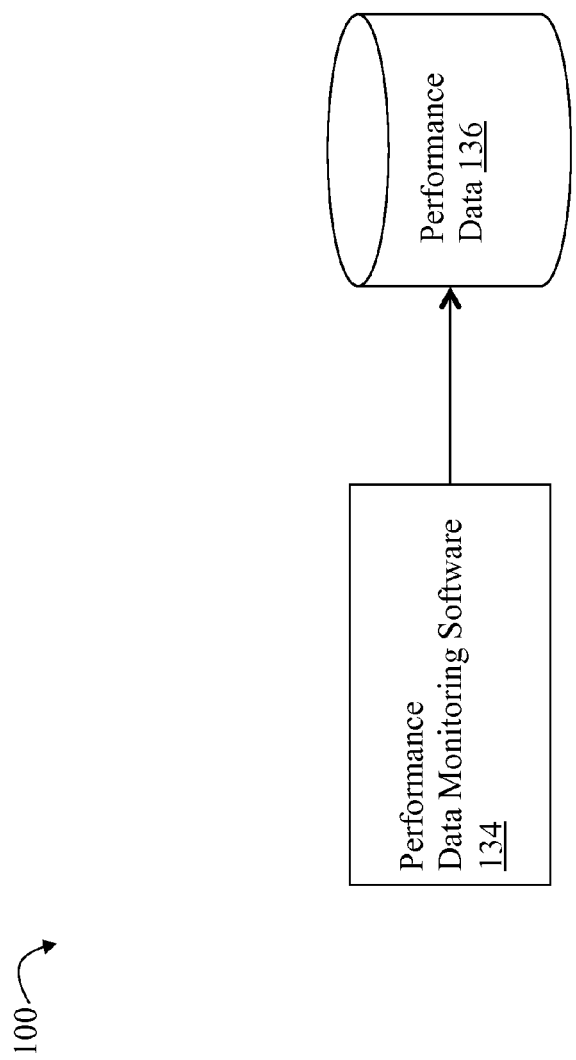
FIG. 3 is an example representing components that may be used in an embodiment in accordance with techniques herein.

Referring to FIG. 3, shown is an example 100 of components that may be used in an embodiment in connection with techniques herein. The example 100 includes performance data monitoring software 134 which gathers performance data about the data storage system. The software 134 may gather and store performance data 136. This performance data 136 may also serve as an input to other software, such as used in connection with performing data storage system optimizations, which attempt to enhance the performance of I/O operations, such as those I/O operations associated with data storage devices 16a-16n of the system 12 (as in FIG. 1). The performance data 136 may be used in determining a workload for one or more physical devices, a pool or group of physical devices, logical devices or volumes (e.g., LUNs), thin or virtually provisioned devices (described in more detail elsewhere herein), portions of thin devices, and the like. The workload may also be a measurement or level of "how busy" a device is, for example, in terms of I/O operations (e.g., I/O throughput such as number of I/Os/second, response time (RT), and the like).

The response time (RT) for a logical or physical storage device or volume may be based on a response time associated with the logical or physical storage device or volume for a period of time. The response time may based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the operations of read and write with respect to a LUN, thin device, and the like, may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular types of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the backend read and write requests or commands performed by the DA. Such read and write commands may correspond, respectively, to physical device accesses such as disk reads and writes that may result from a host I/O request received by an HA 21. In an exemplary embodiment of a multi-tiered storage system, the techniques herein may be described with reference to a storage environment having three storage tiers—a first tier of only SSD or flash drives in the data storage system, a second tier of only FC disk drives, and a third tier of only SATA disk drives. In terms of performance, the foregoing three tiers may be ranked from highest to lowest as follows: first, second, and then third. The lower the tier ranking, the lower the tier's performance characteristics (e.g., longer latency times, capable of less I/O throughput/second/GB (or other storage unit), and the like). Generally, different types of physical devices or physical drives have different types of characteristics. There are different reasons why one may want to use one storage tier and type of drive over another depending on criteria, goals and the current performance characteristics exhibited in connection with performing I/O operations. For example, flash drives of the first tier may be a best choice or candidate for storing data which may be characterized as I/O intensive or "busy" thereby experiencing a high rate of I/Os to frequently access the physical storage device containing the LUN's data. However, flash drives tend to be expensive in terms of storage capacity. SATA drives may be a best choice or candidate for storing data of devices requiring a large storage capacity and which are not I/O intensive with respect to access and retrieval from the physical storage device. The second tier of FC disk drives may be characterized as "in between" flash drives and SATA drives in terms of cost/GB and I/O performance. Thus, in terms of relative performance characteristics, flash drives may be characterized as having higher performance than both FC and SATA disks, and FC disks may be characterized as having a higher performance than SATA.

Since flash drives of the first tier are the best suited for high throughput/sec/GB, processing may be performed to determine which of the devices, and data portions thereof, are characterized as most I/O intensive and therefore may be good candidates to have their data stored on flash drives. Similarly, the second most I/O intensive devices, and portions thereof, may be good candidates to store on FC disk drives of the second tier and the least I/O intensive devices may be good candidates to store on SATA drives of the third tier. As such, workload for an application may be determined using some measure of I/O intensity, performance or activity (e.g., I/O throughput/second, percentage of read operation, percentage of write operations, response time, etc.) of each device used for the application's data. Some measure of workload may be used as a factor or criterion in combination with others described herein for determining what data portions are located on the physical storage devices of each of the different storage tiers.

Figure 4:
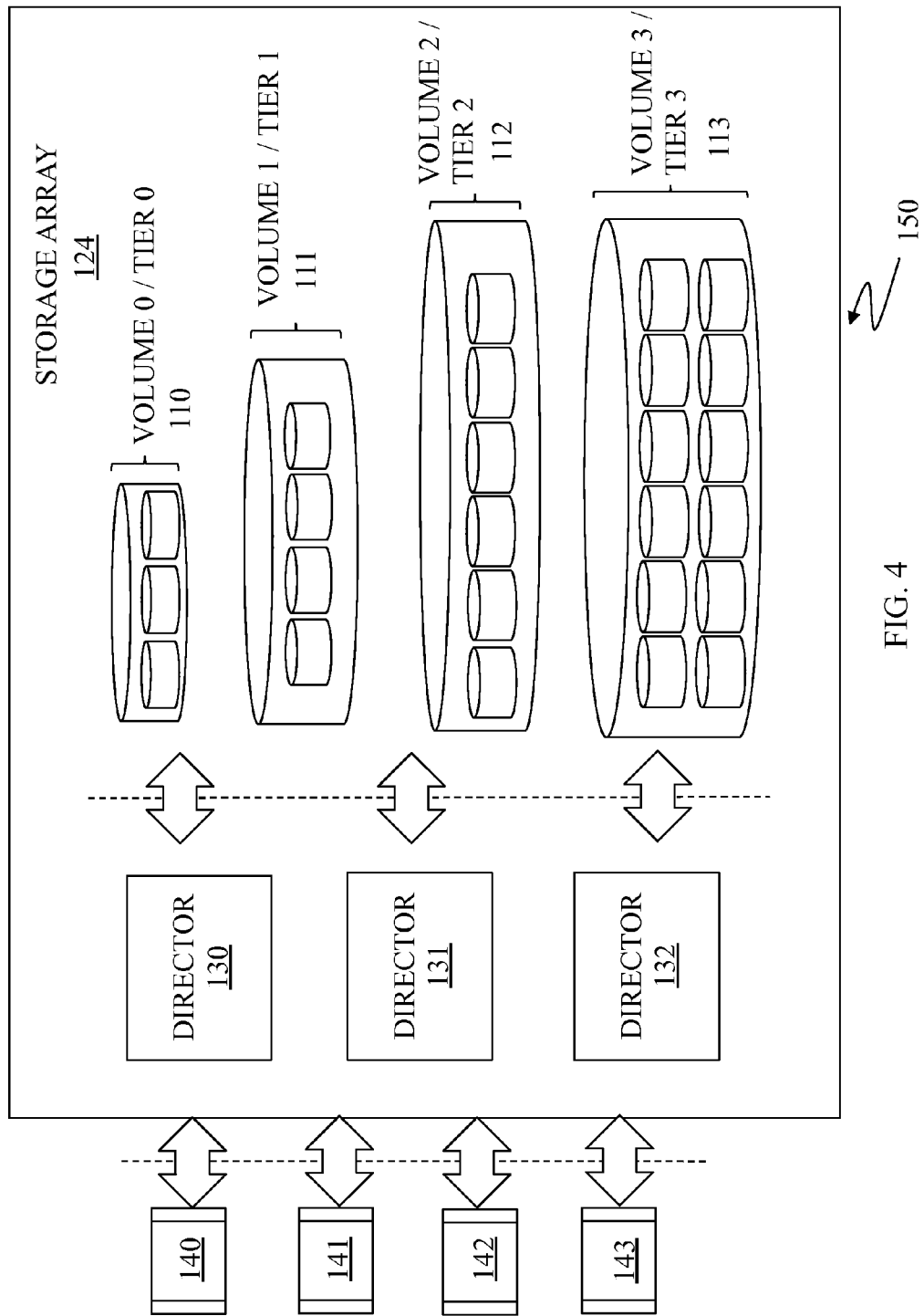
FIGS. 4, 5A, 5B, 10, and 11 are examples illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage volumes (logical devices, LUNs, or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to various embodiments, each of the volumes 110-113 (as well as data portions of a single volume) may be located in different storage tiers. Tiered storage provides that data may be initially allocated to a particular fast volume/tier, but a portion of the data that has not been used over a period of time may be automatically moved to a slower (and perhaps less expensive) tier. For example, data that is expected to be used frequently, for example database indices, may be initially written directly to fast storage whereas data that is not expected to be accessed frequently may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies (e.g., allocation policies, data movement policies including promotion and demotion thresholds, and the like) to transparently automate the control, placement, and movement of data within a storage system based on business needs.

Figure 5A:
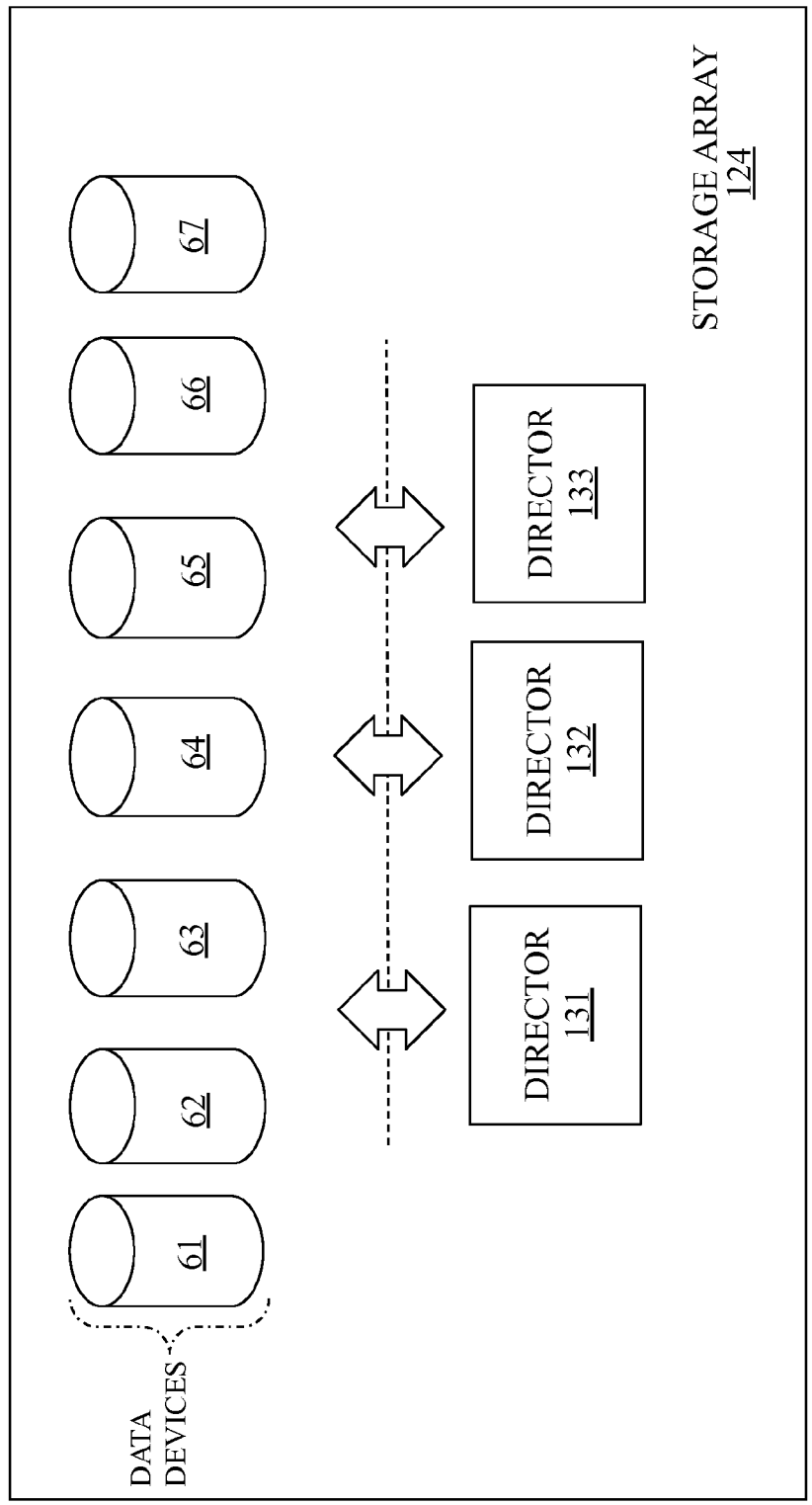

Referring to FIG. 5A, shown is a schematic diagram of the storage array 124 as including a plurality of data devices 61-67 communicating with directors 131-133. The data devices 61-67 may be implemented as logical devices like standard logical devices (e.g., such as thick devices) provided in a Symmetrix® data storage device produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more of the disk drives 42-44 (or more generally physical devices). Thus, for example, the data device section 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-67 may be sections of one data device.

Figure 5B:
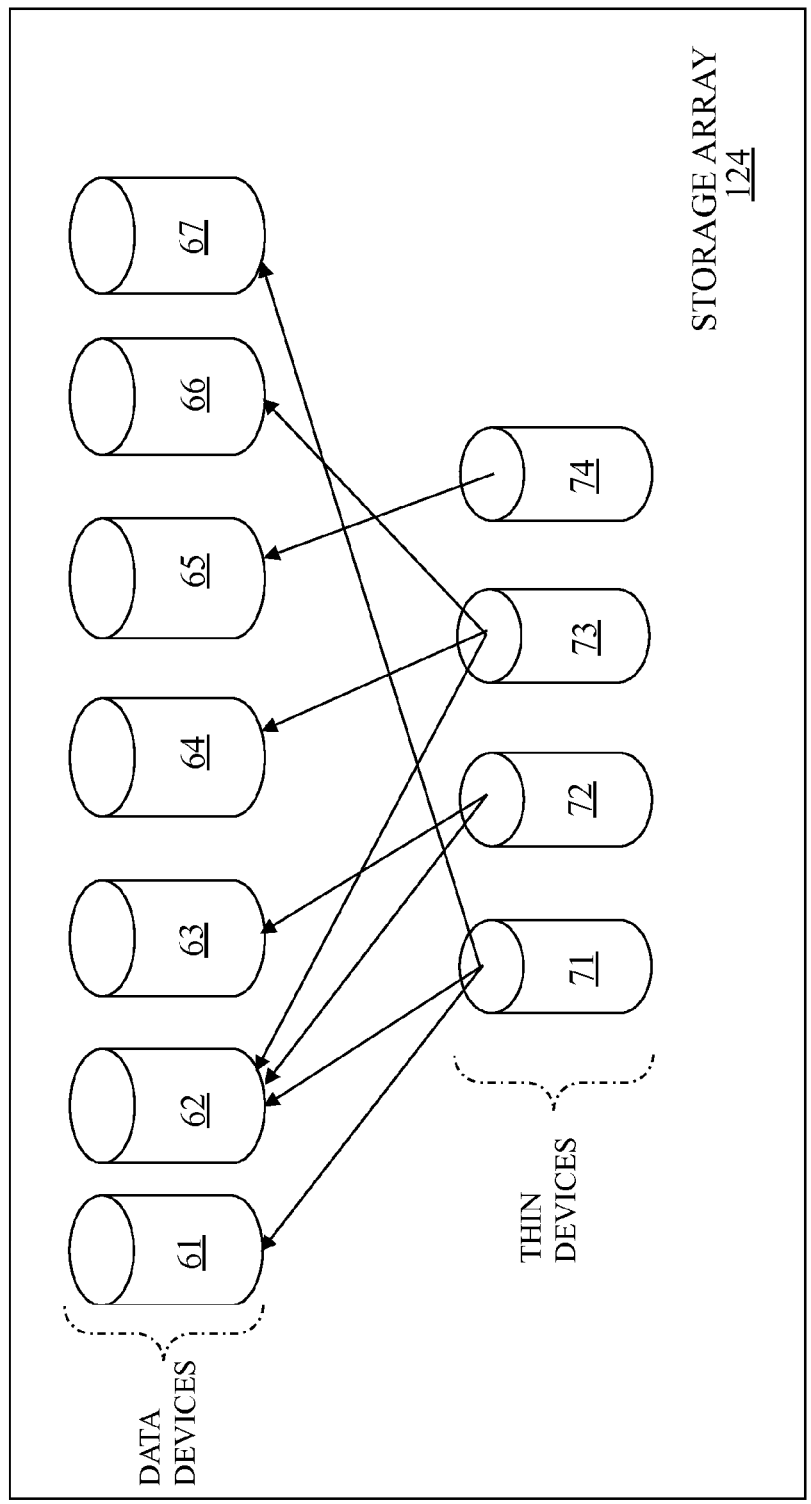

As shown in FIG. 5B, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). As described in more detail elsewhere herein, a thin device may be virtually provisioned in terms of its allocated physical storage in physical storage for a thin device presented to a host as having a particular capacity is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated.

Figure 5C:
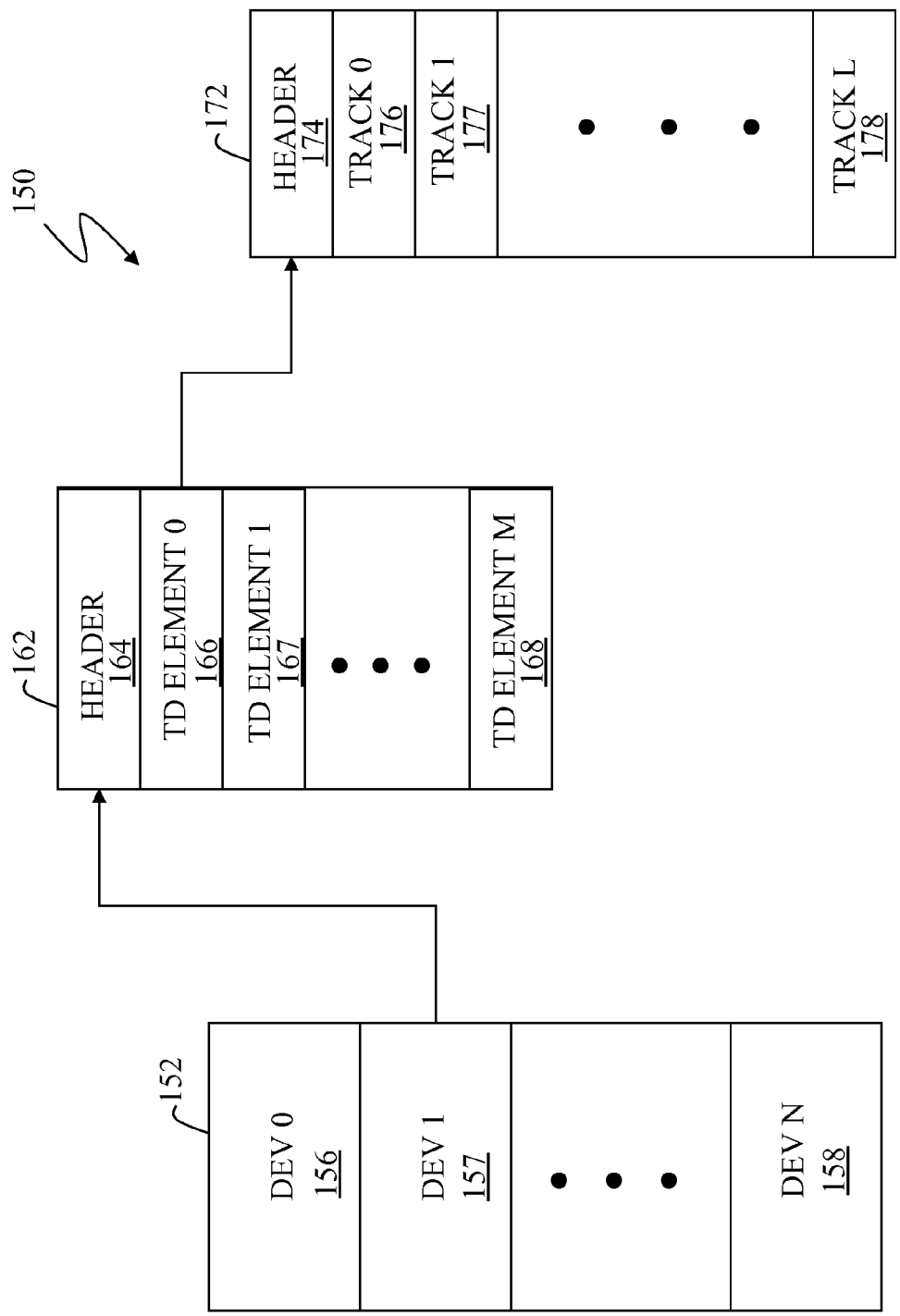
FIG. 5C is a schematic diagram illustrating tables that are used to keep track of device information in connection with an embodiment of the system described herein.

Referring to FIG. 5C, shown is a diagram 150 illustrating tables that are used to keep track of device information. A first table 152 corresponds to all of the devices used by a data storage system or by an element of a data storage system, such as an HA 21 and/or a DA 23. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 5D:
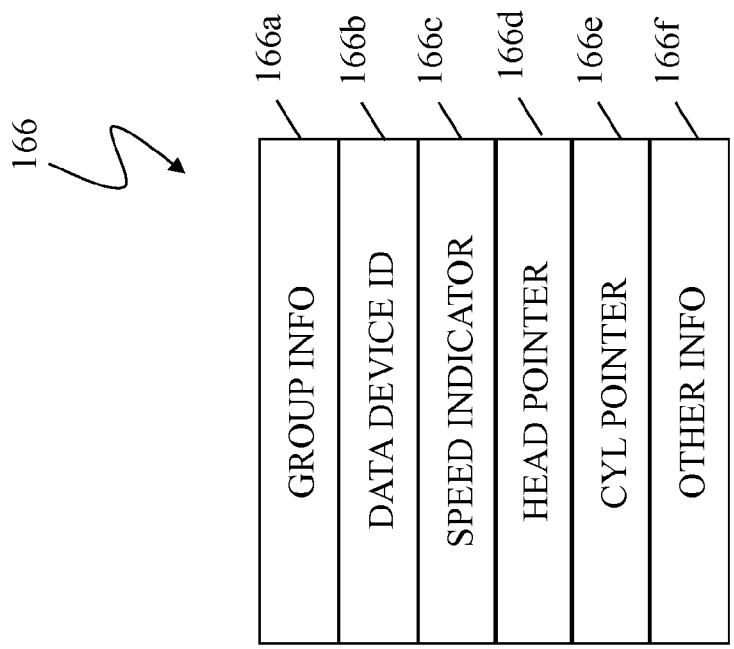
FIG. 5D is a schematic diagram showing a group element of a thin device table in connection with an embodiment of the system described herein.

Referring to FIG. 5D, shown is a schematic diagram illustrating a group element 166 of the thin device table 162 in connection with an embodiment of the system described herein. The group element 166 may includes a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Figure 6:
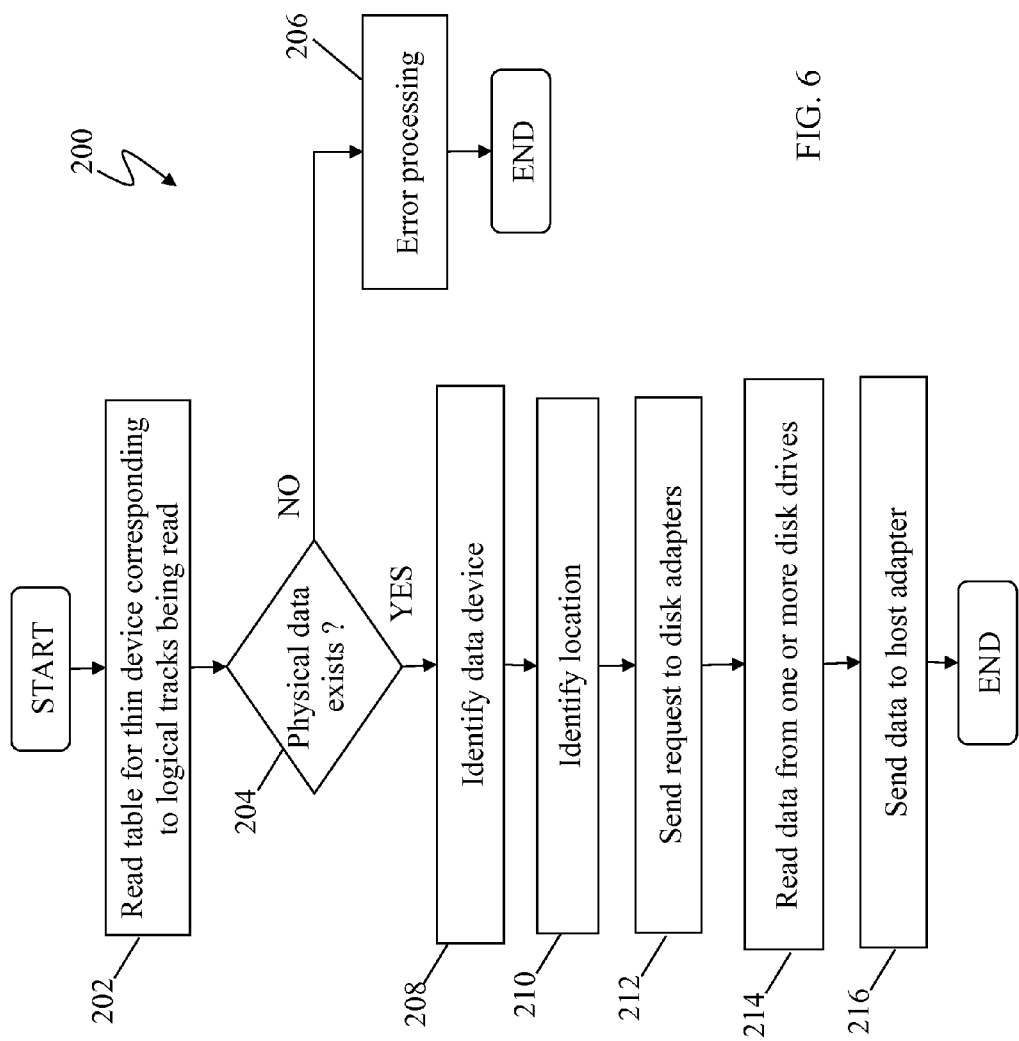
FIGS. 6, 7, 8, 9, 12, 13, 14, 15, 20, 22, and 23 are flowcharts of processing steps that may be performed in an embodiment in accordance with techniques herein.

FIG. 6 is a flowchart 200 illustrating processing for handling a read of one or more logical tracks of one of the thin devices 71-74 in an embodiment of the system described herein. In a step 202, an appropriate one of the host adapters 32-34 reads the group table 112 of the one of the thin devices 71-74 corresponding to the logical tracks being read. After the step 202, at a test step 204, it is determined whether the logical tracks identified from the group table 112 corresponds to any of the data devices 61-67 (i.e., if there is physical data corresponding to the logical tracks being read). If there is no corresponding physical data (meaning that no logical track(s)

were ever written), then processing proceeds to a step 206 where error processing is performed, such as returning a NULL value to the host. Other appropriate error processing may be performed at the step 206. After the step 206, processing is complete.

If it is determined at the step 204 that there is physical data corresponding to the logical tracks being read, then processing proceeds to a step 208 where one or more of the data devices 61-67 associated with the logical tracks being read are identified from the group table 112. After the step 208, processing proceeds to a step 210 where the track table 122 is read from the identified one or more of the data devices 61-67 and the corresponding location of the physical data (i.e., cylinder and track) is determined. As further discussed elsewhere herein, physical storage space may be provided in connection with one data device and/or by a concatenation of multiple data devices or portions thereof. Logical storage space maps to space on the data devices.

After the step 210, processing proceeds to a step 212 where a request may be sent to one or more disk adapters 36-38 corresponding to disk drives 42-44 that provide the physical storage space associated with the identified one of the data devices 61-67 and corresponding location information. After the step 212, processing proceeds to a step 214 where the physical data is read. Note that the data may be stored in a cache or other memory (for example, the memory 46) in connection with being read. In some cases, if the data being read is already in the cache, then the processing at the step 212 and following steps may not be necessary. Note also that reading the data may include updating any metadata used to provide the processing described herein, such as the time last accessed, the host/user making the request, frequency of use, and/or any other appropriate metric. After the step 214, processing proceeds to a step 216 where the data may be received by an appropriate one of the host adapters 32-34 (e.g., by reading the memory 46). After the step 216, processing is complete.

Figure 7:
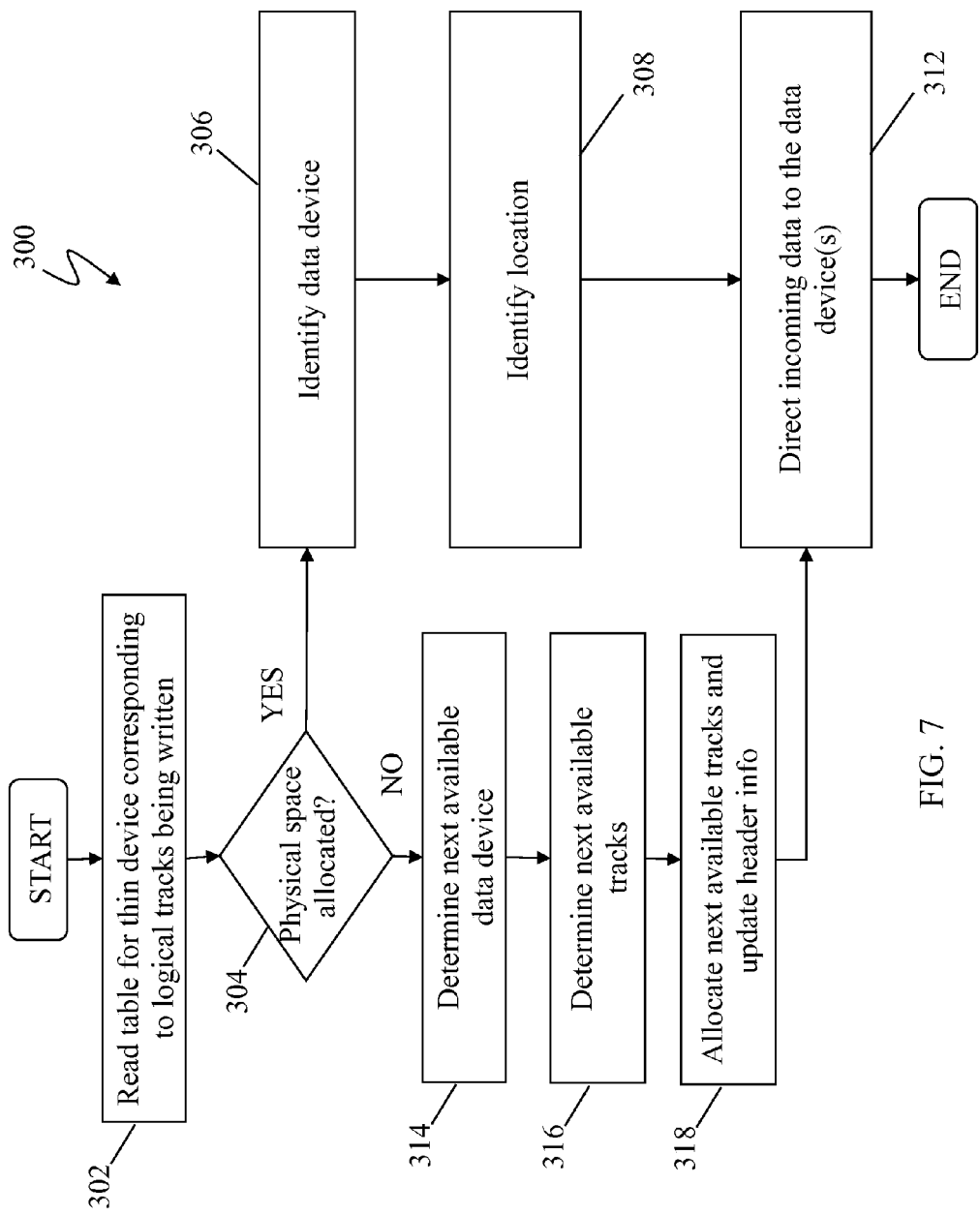

FIG. 7 is a flo chart 300 illustrating processing for handling a write of logical track(s) to one or more of the thin device(s) 71-74 in connection with the system described herein. At a step 302, an appropriate one of the host adapters 32-34 reads the group table 112 of the one of the thin device(s) 71-74 corresponding to the logical tracks being written.

Following the step 302 is a test step 304 where it is determined whether physical space had been previously allocated (i.e., in a prior write operation) for the logical tracks being written. If so, then processing proceeds to a step 306 where the data device that includes the logical tracks is identified. After the step 306, is a step 308 where the track table 122 is read from the identified one or more of the data devices 61-67 and the corresponding location of the physical data (i.e., cylinder and track) is determined. As further discussed elsewhere herein, physical storage space may be provided in connection with one data device and/or by a concatenation of multiple data devices or portions thereof. Logical storage space maps to space on the data devices. Following the step 308 processing proceeds to a step 312 where the data being written is directed to the appropriate physical storage space. The incoming data overwrites the appropriate portion of the data where directed. After the step 312, processing is complete.

If it is determined at the step 304 that there is no physical storage that has been allocated for the logical track(s) being written, then control transfers from the step 304 to a step 314, where a next available data device identifier (i.e., the data device 68) is determined. This information may be obtained from the header 114 of the device table 112. In an embodiment herein, data device identifiers are provided by numbers so that a next available data device identifier is simply one more than a last allocated data device. However, as discussed in more detail elsewhere herein, selection of a data device at the step 314 may include application of other criteria.

After the step 314, processing proceeds to a step 316 where available physical storage space on the disk drives 42-44 is determined. In an embodiment herein, available physical storage space is allocated sequentially from one or more of the disk drives 42-44. Following the step 316 is a step 318 where a request may be sent to a disk adapter 36-38 (or possibly the RA 48 and/or the EA 49) to allocate the physical storage space for the write. Also at the step 318, header info is updated to reflect the newly allocated data device and physical tracks. After the step 318, processing proceeds to the step 312, discussed above, where the data being written is directed to the one or more data devices. After the step 312, processing is complete.

After the read and write processes illustrated in FIGS. 6 and 7, information concerning access of the data, such as access frequency, time of last access or use and/or other characteristics, metrics, and statistics, may be updated and stored by the system described herein. The updated data access information or other characteristic information of the data and/or any portion of the data may, for example, be stored as an entry in a group element of the thin device table 112 (for example, the entry 166f of the group element 166 as shown in FIG. 5d). Alternatively, the data characteristic information may be stored in a memory, such as the global memory 46 of the storage device 30, and a pointer to this information stored in the group element 166. Other implementations for storing and access of the data characteristic information are possible.

The allocation of the physical storage space for a thin device at the time of writing the data, as well as the policies that govern the allocation, may be transparent to a user. For example, a user's inquiry into how much storage space is available on a particular thin device may indicate a maximum amount of physical storage space that could be allocated for a thin storage device (provisioned storage space) even though the corresponding physical storage space had not yet been allocated. In an alternative embodiment, the policy for the thin device may be to report something less than the total maximum that could be allocated. In some embodiments, used physical storage space may not exceed 30% of the provisioned storage space.

In an embodiment herein, different portions of the physical data may be automatically moved between different physical disk drives or other storage devices (different tiers) with the same or different characteristics according to one or more policies. For example, data may be initially allocated to a particular fast disk drive, (relatively high tier) but a portion of the data that has not been used over a period of time (for example, three weeks) may be automatically moved, according to the system described herein, to a slower (and perhaps less expensive) disk drive (relatively lower tier). The physical data may then be automatically moved back to the higher tier if the data is subsequently used and/or accessed according to a policy or other criteria (for example, accessed twice in any given week), as further described herein. Thus, the system described herein may operate to automatically move data between tiers within the same machine according to the one or more policies.

A policy may be configured by an administrator on a system-wide level or may be specific to a particular user on a specific logical device. The system described herein allows for the remapping of physical data based on policy criteria or other metrics and statistics. For example, the policy may be based on the last time data was used and/or accessed. Alternatively, the policy may be based on anticipated use of data over specific times and/or dates. For example, data that is expected to be used at a particular time may be stored on (or relocated to) relatively fast tier and then moved to relatively slow tier when it is expected that the data will not be used again for a lengthy period of time. Moreover, different policies and/or criteria may be implemented corresponding to different users and/or different levels of importance or security of data. For example, it may be known that user A accesses particular data more frequently than user B and, accordingly, the policy for moving physical data according to the system described herein may be to leave more data associated with user A on the relatively fast disk drive as compared with the data associated with user B. Alternatively, user A may access data that is generally of a higher level of importance or requires higher security than that of user B and, accordingly, the system described herein may maintain and/or move more data associated with user A on a disk drive that is relatively more reliable, available and/or secure as compared with the data associated with user B.

In an embodiment herein, data may be moved between physical disk drives (or other physical storage) having different characteristics, such as speed, cost, reliability, availability, security and/or other characteristics. As discussed elsewhere herein, logical data devices may be established having different classes corresponding to characteristics of the physical disk drives (or other physical storage) to which the data devices are mapped. Further, it should be noted that any section of the logical device may be moved according to the system described herein based on the characteristics of the data (and governed by default or specific policies).

Figure 8:
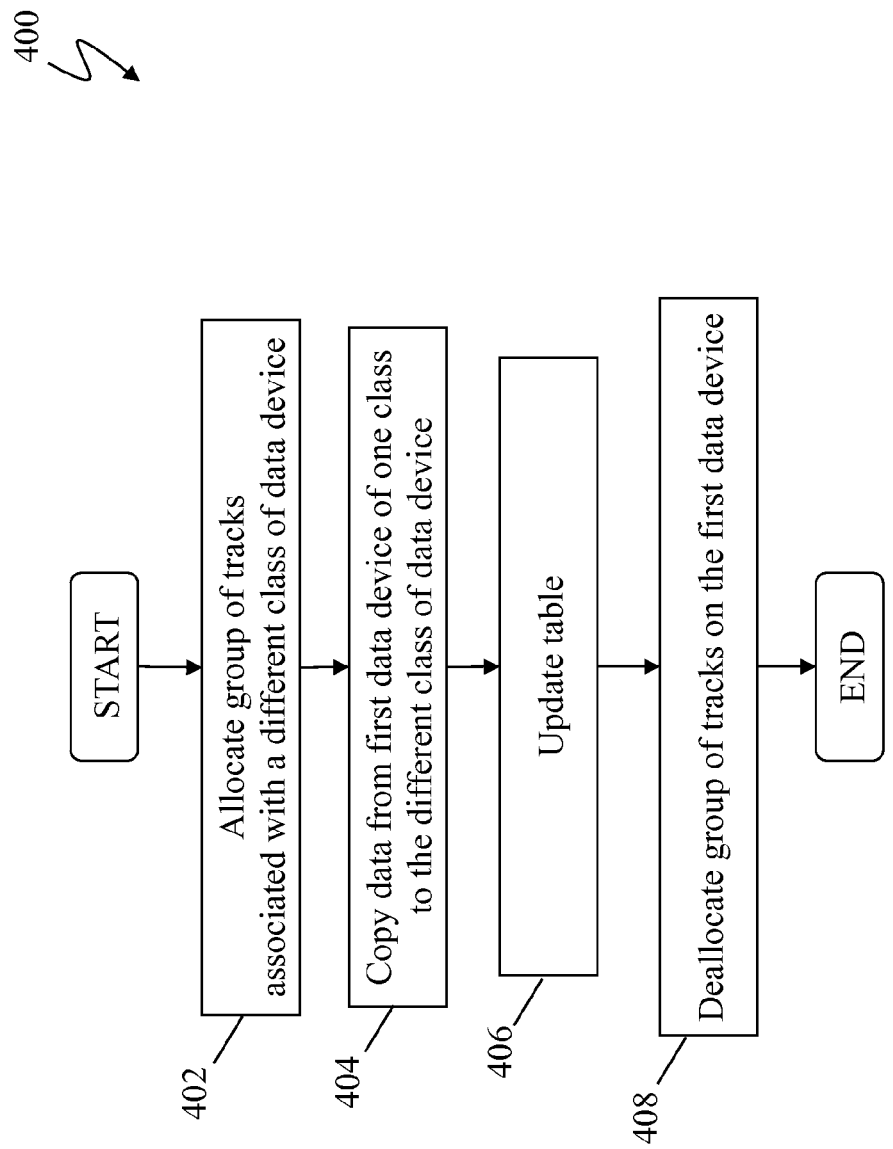

FIG. 8 is a flowchart 400 illustrating processing for copying and remapping physical data according to the system described herein. In a step 402, space for a group of tracks is allocated on a second data device having a different class from that of a first data device (data source). The first data device has a first storage class that is different from a second storage class of the second data device. For example, the second data device may be mapped to a physical disk drive that is slower than that of the first data device of the first class, as further discussed elsewhere herein. After the step 402, processing proceeds to a step 404 where data associated with the data device of the first class is copied to a location corresponding to the data device of the second class. After the step 404, processing proceeds to a step 406 where the group table of the thin device is updated in accordance with the remapping. After the step 406, processing proceeds to a step 408 where the group of tracks associated with the data device of the first class, from which the data was copied, is deallocated, freeing the locations for future use.

Figure 9:
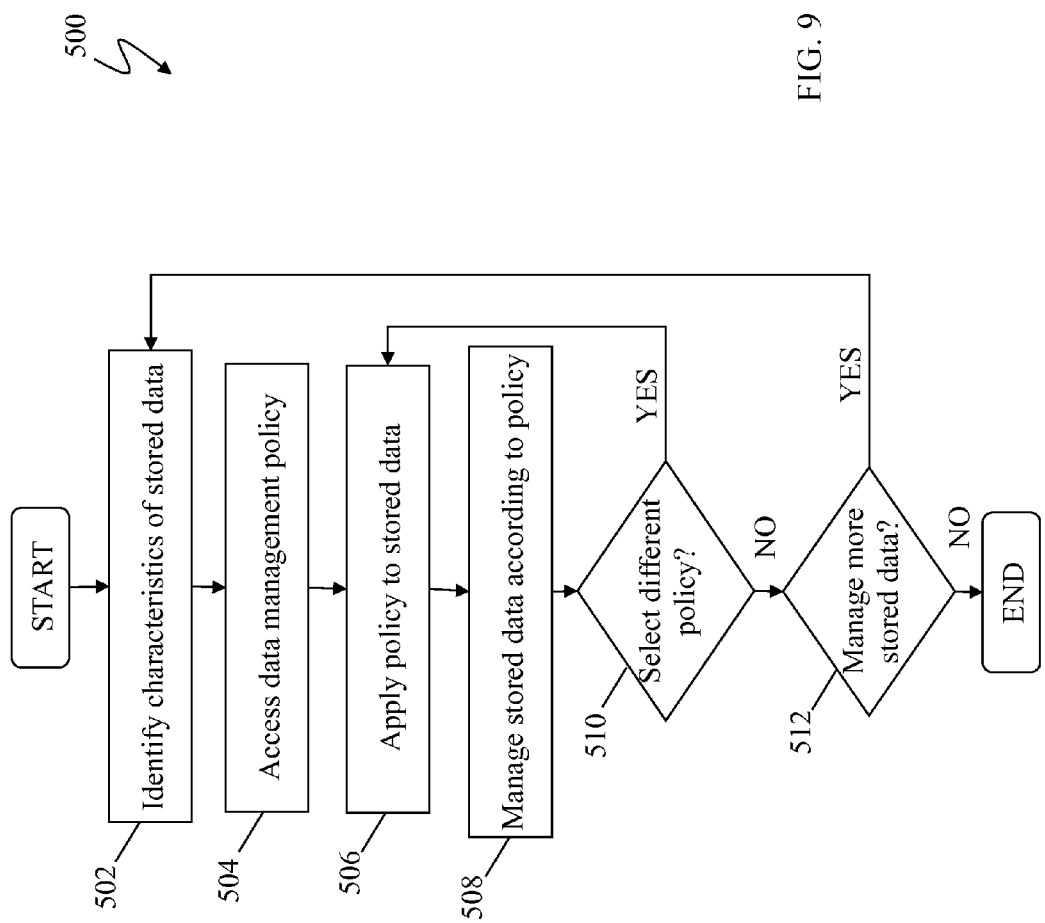

FIG. 9 is a flowchart 500 illustrating implementation of a policy for data storage and management in connection with an embodiment of the system described herein. In a step 502, certain characteristics of stored data are identified (for example, from the group element 166, as discussed elsewhere herein). In various embodiments, the characteristics may include usage information such as when the stored data was last accessed and/or how often the stored data has been accessed over a specific time period (for example, hours, days, weeks, etc.). It is also possible to determine how long (on average or in aggregate) it has taken to service each specific I/O request to the data. As further discussed elsewhere herein, the characteristics may also include particular user information corresponding to the stored data.

After the step 502, processing proceeds to a step 504 where policy information is accessed. The policy information provides the specific criteria used for data storage and management. After the step 504, processing proceeds to a step 506 where the policy is applied to the stored data. The policy may include criteria used for managing stored data such as criteria concerning frequency of use of data and/or criteria with respect to specific users and/or other criteria, such as file name, file type, file path, requesting application, expected time to re-use of the data, temporary storage only, life expectancy of the data, data type (e.g., compressed, encrypted, de-duped) and/or protection requirements of the data (e.g., store on an encrypted tier). The policy may be applied to identify data for lifecycle management according to characteristics of entire data volumes or any portions thereof. The policy may also consider the access history, effective performance or other characteristics about the data that might be utilized to optimize the performance, cost, availability or retention requirements of the data.

After the step 506, processing proceeds to a step 508 where the data for which characteristics have been determined is managed according to the policy and based on the characteristics of the data. For example, data that is frequently used may be moved to a relatively fast storage device whereas data that has not been used over a certain period of time may be moved to a relatively slow storage device according to the data processing as discussed elsewhere herein. As noted herein, the data that is moved may be entire data volumes or portions thereof. As discussed elsewhere herein, it may be possible to provide fairly sophisticated analysis to determine whether to promote data (move to a relatively faster storage device) or demote data (move to a relatively slower storage device).

After the step 508, processing proceeds to a test step 510 where it is determined if another policy with other criteria should be applied to the stored data being managed. If an additional policy is to be applied, then processing proceeds to the step 506. If no further policies are to be applied, then processing proceeds to a test step 512 where it is determined whether there is more data to be managed according to the system described herein. If there is further stored data to manage, then processing proceeds back to the step 502. If no further stored data is to be managed, then after the test step 512, processing is complete. In some cases, tracking, avoiding and resolving conflicting priorities would be handled to ensure that two policies do not create a "ping-pong" effect, moving data blocks up- and down-in a never ending cycle.

As discussed elsewhere herein, the data devices 61-67 may be associated with physical storage areas (e.g., disk drives, tape, solid state storage, etc.) having different characteristics. In various embodiments, the physical storage areas may include multiple tiers of storage in which each tier of storage areas and/or disk drives that may be ordered according to different characteristics and/or classes, such as speed, technology and/or cost. The thin devices 71-74 may appear to a host coupled to the storage device 30 as a logical volume (logical device) containing a contiguous block of data storage, as discussed herein. Each thin device 71-74 may correspond to a particular data device, a portion thereof and/or multiple data devices. Accordingly, each thin device 71-74 may map to storage areas across multiple storage tiers. As a result, although each thin device 71-74 may appear as containing a logically contiguous block of storage, each thin device 71-74 may allow for blocks of data to be transparently stored (and/or retrieved) from discontiguous storage pools made up of the varying classes of data storage devices. In this way, the granularity at which the system for tiered storage described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage tiers or different sized data blocks within a single storage tier.

Figure 10:
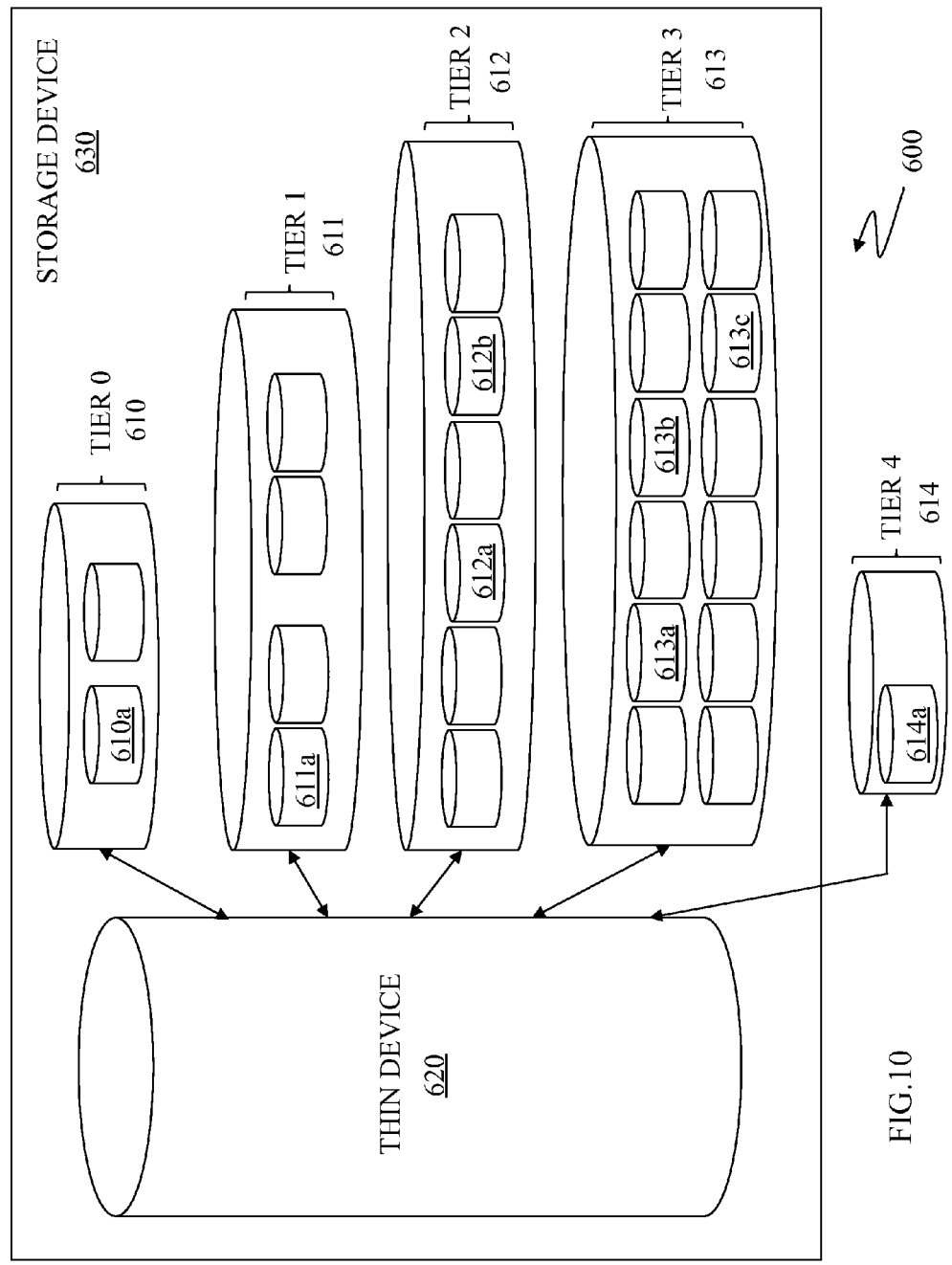

FIG. 10 is a schematic illustration of a fine grained tiered storage system 600 according to an embodiment of the system described herein. A storage device 630 is shown including a thin device 620, like the thin devices 71-74 discussed elsewhere herein, that may be coupled to multiple physical storage devices across multiple storage tiers. As discussed elsewhere herein, the storage tiers may be associated with data devices, like the data devices 61-67 discussed herein, so that, for example, there is one data device for each storage tier, one data device for multiple storage tiers, any portion of a data device for any portion of the pools of storage shown for the storage tiers, and/or any combinations thereof. For example, in an embodiment, a top tier storage pool 610 (e.g., tier 0) may include flash/solid state disk (SSD) drives that are relatively fast and expensive. Other storage pools 611-613 (e.g., tiers 1-3) may include disk drives of decreasing speeds or other configurations (i.e., 15 k rpm, 10 k rpm, 7.5 k rpm redundant array of independent disk (RAID) storage). The lowest tier of storage pool 614 (e.g., tier 4) may include, for example, tape storage, largest capacity disk drives (such as massive array of idle disks (MAID) storage). As illustrated, the last storage tier 614 may include storage devices external to the storage device 630 that may be suitable for long term storage of data that is infrequently accessed. However, note that external storage could have specific characteristics such as tape, or might perform additional processing to optimize the storage of data, such as de-duplication. In some embodiments, external storage might be used to support tier 2 or tier 3 class applications. The thin device 620 may map to different storage areas (devices) across multiple tiers.

As discussed elsewhere herein, the granularity of the system may be less than at the file level and allow for blocks of data of any size to be stored across multiple storage tiers 610-613 of the storage device 630 in a process that is transparent to the host and/or host application. For example, in the illustrated embodiment, the thin device 620 may map blocks of data to storage areas (devices) such as a storage area 610a in the pool of storage of the top storage tier 610, a storage area 611a in the pool of storage of the next storage tier 611, storage areas 612a, 612b in pool of storage of the next storage tier 612, and storage areas 613a, 613b, 613c in the pool of storage of the next storage tier 613. As discussed elsewhere herein, the last storage tier 614 may include external storage and the system described herein may map to a storage area 614a in the pool of storage in the tier 614.

Mirroring (backup) of data may also be facilitated by tiered storage across multiple tiers according to the system described herein. For example, data that is accessed frequently may be stored on a fast storage device (tier 0) while a mirrored copy of the data that is not expected to be accessed may be stored on a slower storage device in one or more other tiers (e.g., tiers 1-4). Accordingly, the same data may be stored on storage devices of multiple tiers of storage pools.

Figure 11:
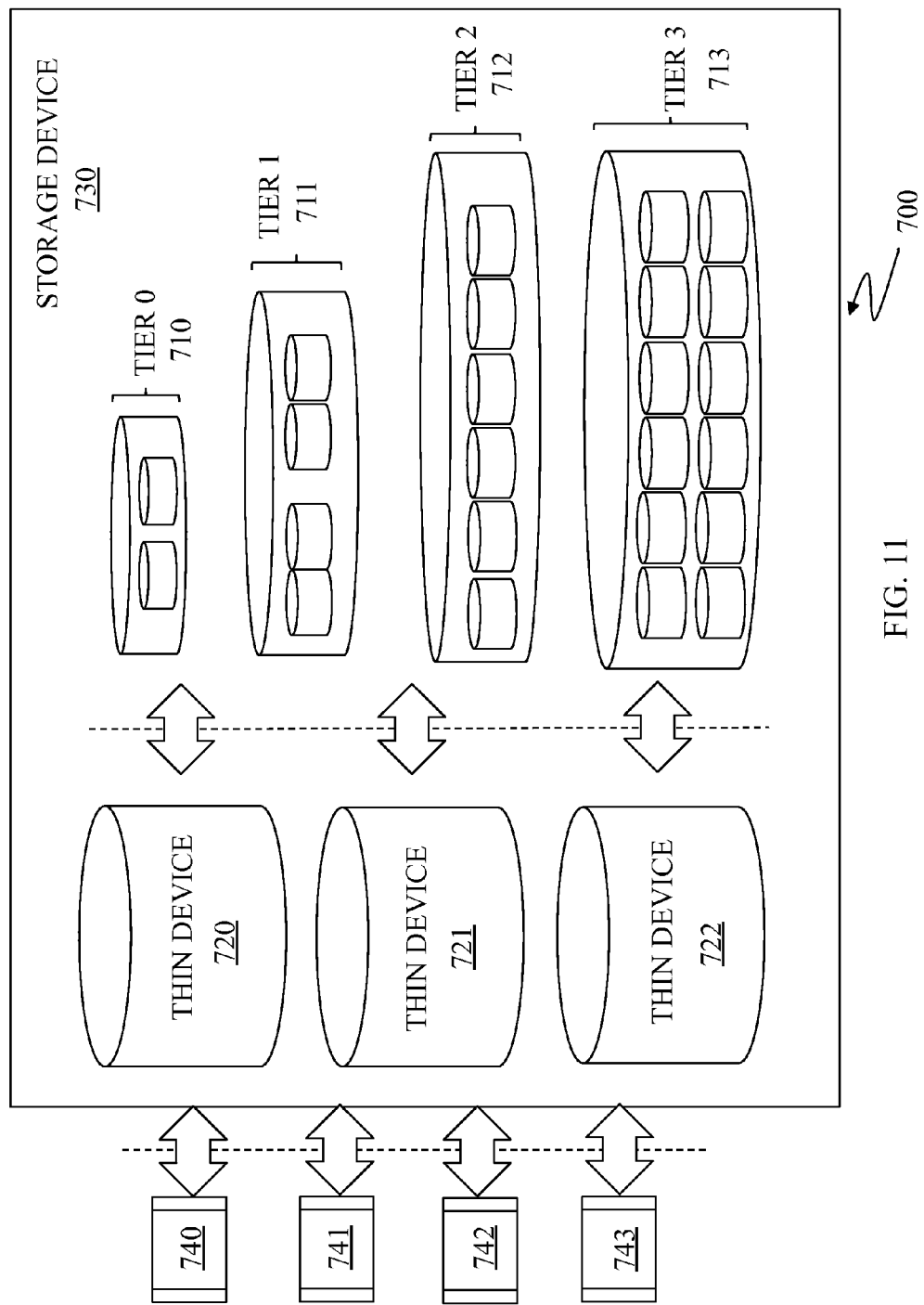

FIG. 11 is a schematic illustration showing a fine grained tiered storage system 700 according to an embodiment of the system described herein. As illustrated, a storage device 730 includes multiple thin devices 720-722 and multiple pools of storage in multiple storage tiers 710-713. Host applications 740-744 and/or other entities (e.g., other storage devices, SAN switches, etc.) request data writes and data reads to and from the storage device 730. In various embodiments, multiple host applications 740-744 may share a single one of thin devices 720-722 and/or multiple thin devices 720-722 may be mapped to the same set of storage pools 710-713.

In an embodiment herein, a write target policy may be applied to data that is being written according to the system described herein. For example, data that is expected to be used frequently, for example database indices, may be initially written directly to fast storage (e.g., tier 0 flash/SSD storage) whereas data that is not expected to be accessed frequently, for example backup or archived data, may be initially written to slower storage devices (e.g., tier 4 MAID or external storage). In this manner, data is efficiently stored by targeting the write to storage areas and devices according to the estimated or expected access frequency of the data, beginning with the initial write of the data and also applying to subsequent data writes that jump across multiple tiers.

The process for determining the appropriate target storage location of the write of the data may be made based on the logical unit number (LUN) ID of the device from which the data is being written, where the storage device 730 may have or obtain information about the types of data stored on specific logical units. Alternatively, additional policies and capabilities may be enabled by adding host-resident "extension" software, for example to tag I/O requests with information about the requesting application or user so that the determination may be made based on other information provided by the host and/or entity accessing the storage device 730 (e.g., a target policy indicator provided with each write or class of writes). Other possible criteria include the time of day, the size of the incoming write operation (e.g. very large sequential writes vs. smaller random writes), file name, file type, host OS type, data type, access patterns, inter-dependent accesses to other data, etc. It is also possible that "hints" from the host could also be used, particularly relating to performance and availability requirements of the data, etc.

The system described herein may include automatic promotion and demotion policies to facilitate optimization of performance, storage availability and power. For example, a least recently used (LRU) policy may be used to demote data blocks in order to pro-actively make room for new writes of data blocks and/or promotions of data blocks within the system. A most frequently used (MRU) policy may be used to promote data blocks that are frequently used to faster storage tiers. Predictive policies may be used to recognize that data blocks that will be needed before they are actually needed and promote the data blocks accordingly (for example, nightly batch jobs, etc.). Alternatively, the system described herein may include an application programming interface (API) that allows a hosts/users/applications to inform the storage that certain blocks should be promoted or demoted to different tiers. Note that promotion and demotion may relate to a relative ordering of tiers where promotion refers to moving data to physical storage that is relatively faster and demotion refers to moving data to physical storage that is relatively slower.

Other special purpose policies may also be used. As discussed elsewhere herein, mirroring of data blocks across multiple tiers may be used. For example, for frequently used data blocks, one copy may be written to flash/SSD memory at a top storage tier and a second copy mirrored to another storage tier (e.g., tier 3 or tier 4). Another policy may include promoting and/or demoting a data block, but not deleting the data block from its pre-promoted or demoted location until the data block is modified. This policy offers advantages including when subsequently demoting the block (if unmodified), a copy may already exist on a slower storage tier and an additional copy does not need to be made (only the copy on the faster storage tier deleted). When a data block is modified, the previous copy on a different storage tier may be deleted.

Other policies may include manual or automatic pre-promotion and post-demotion policies. For example, blocks may be promoted in the background immediately before batch runs (e.g., billing runs etc.). Additionally, writes for such processes as back-ups may required the fastest possible write, but never (or only infrequently) read. In this case, writes may be written to a top storage tier and immediately scheduled for demotion to a lower storage tier. With MAID storage, data blocks that are rarely or never used may be consolidated onto individual spindles that may then be powered off, providing a reduction in power consumption for storage of data blocks infrequently accessed. Further, sequential/contiguous blocks may be coalesced and relocated in an optimization process that may include other advanced strategies, including aligning indices near to data being indexed. It is also possible to have a de-duplication policy in which nothing is deleted from storage in a de-dup tier. Data blocks in storage pools of a de-dup storage tier may be promoted to fast storage tiers as needed, but block and index/metadata in the de-dup storage may be maintained even if a data block is promoted to a faster storage tier and modified or deleted. Maintenance of de-dup storage tiers may involve "use counters" and/other mechanisms that may be used with known data cleaning processes such as garbage collection, etc.

In an embodiment herein, one or more policies may be provided to guarantee a particular level of performance and/or that a particular percentage of data is to be provided on storage having certain characteristics (e.g., speed). The policy may guarantee a minimum number for I/Os per second (IOPS) and/or may guarantee greater than a minimum IOPS for any I/O operation.

Figure 12:
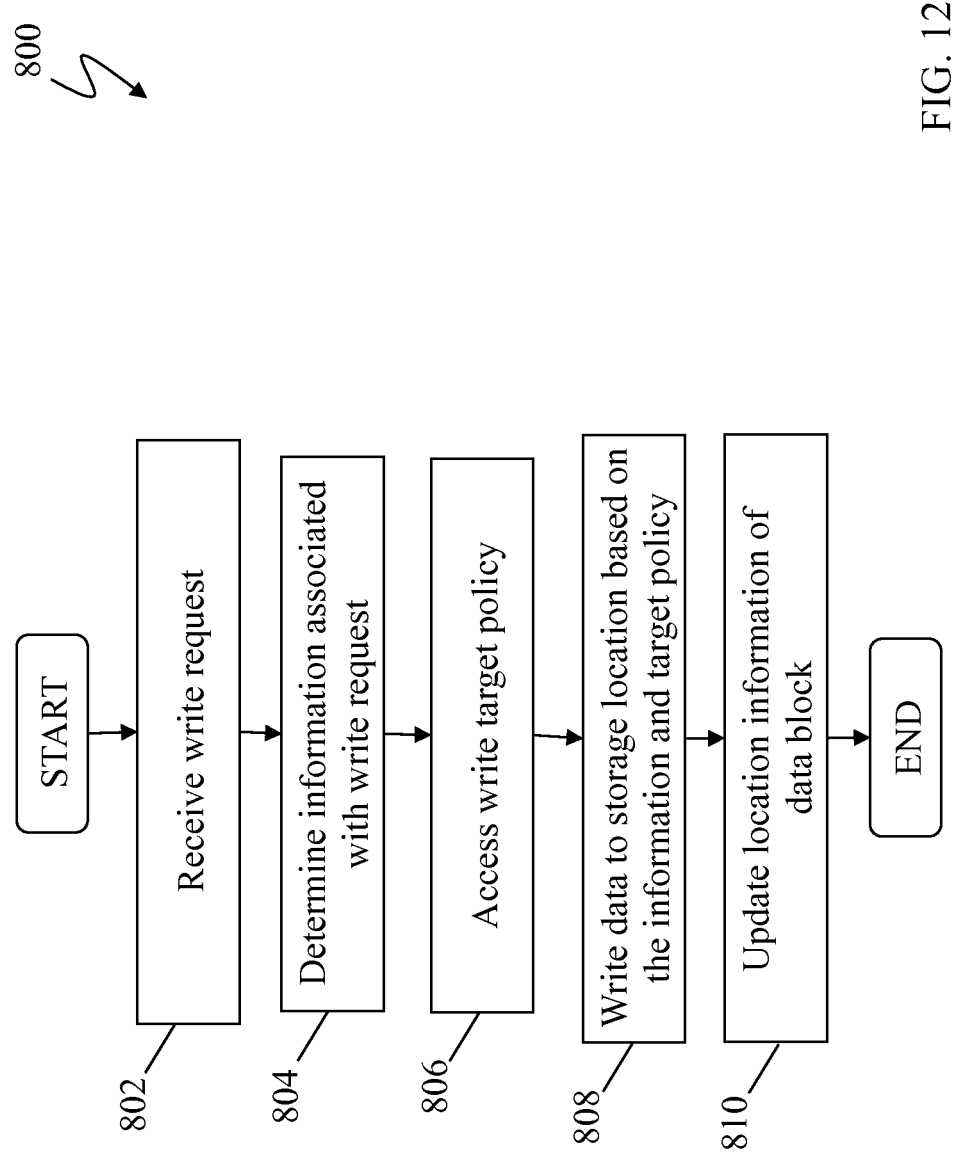

FIG. 12 is a flowchart 800 of processes for writing data blocks in a fine grained tiered storage system based on one or more policies according to an embodiment of the system described herein. At a step 802, a request for a write of data is received by a thin device or other logical device associated with a storage device, as described herein. After the step 802, processing proceeds to a step 804 where information associated with the data block is determined. For example, as further discussed elsewhere herein, the information may be the logical unit number (LUN) ID of the device from which the data is being written and/or may other information provided by the host and/or other entity accessing the storage device. After the step 804, processing proceeds to a step 806 where a write target policy is accessed. For example, as further discussed elsewhere herein, the write target policy may specify that data that is expected to be used frequently may be initially written directly to faster storage in a first storage tier whereas data that is not expected to be accessed frequently may be initially written to slower storage devices in a lower storage tier.

After the step 806, processing proceeds to a step 808 where the determined information associated with the data is processed according to the target policy and the data block is written to a storage location in the storage device according thereto. Accordingly, the data block may initially be written to a storage area (device) in a pool of storage of a storage tier corresponding to the anticipated frequency of use of the data block and/or according to other criteria. After the step 808, processing proceeds to a step 810 where information concerning the location of the data block is updated in a table of information in the thin device, as further discussed elsewhere herein. After the step 810, processing is complete.

In some cases, there may be insufficient available free space to write data to the storage tier corresponding to the storage policy at the step 808. This may be addressed in a number of ways. One possibility is to maintain the data in cache memory until space becomes available, which can occur when data is moved from the target tier as a result deletion of promotion/demotion based on storage policies. Note also that it is possible to temporarily store the data in a lower tier, and then schedule the data for promotion to the appropriate tier using any appropriate mechanism, such as setting a flag that causes the data to be promoted before any other data.

Figure 13:
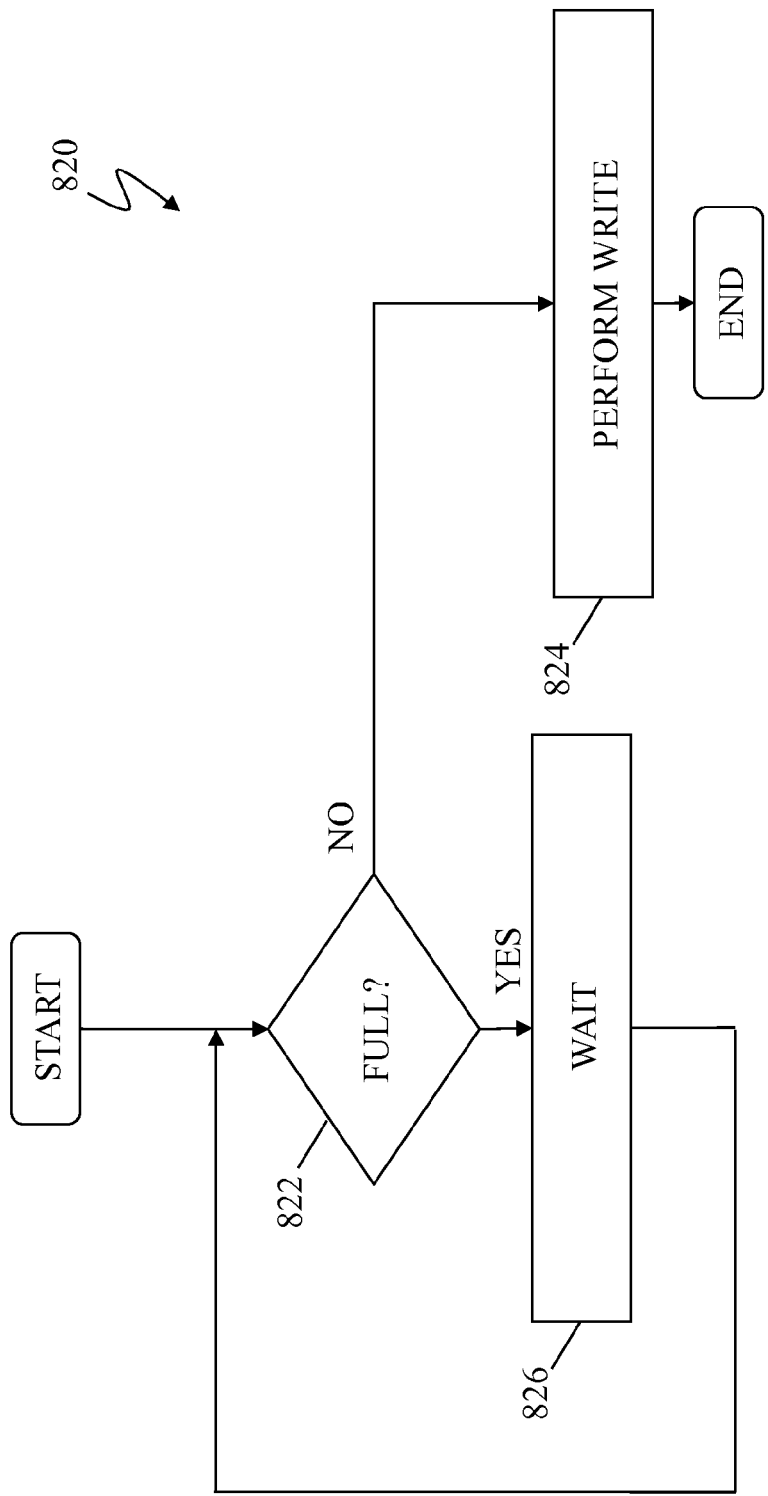

FIG. 13 is a flowchart 820 illustrating steps performed in connection with writing data to a storage tier that may be full. Processing begins in the first test step 822 where it is determined if the storage tier is full. If not, then control passes from the test step 822 to a step 824 where the data is written to the storage tier. Following the step 824, processing is complete. If it is determined at the test step 822 that the storage tier is full, then control passes from the test step 822 to a step 826 where wait processing is performed. The wait at the step 826 could be for any appropriate amount of time. Following the step 826, control passes back to the test step 822 for a new iteration.

Figure 14:
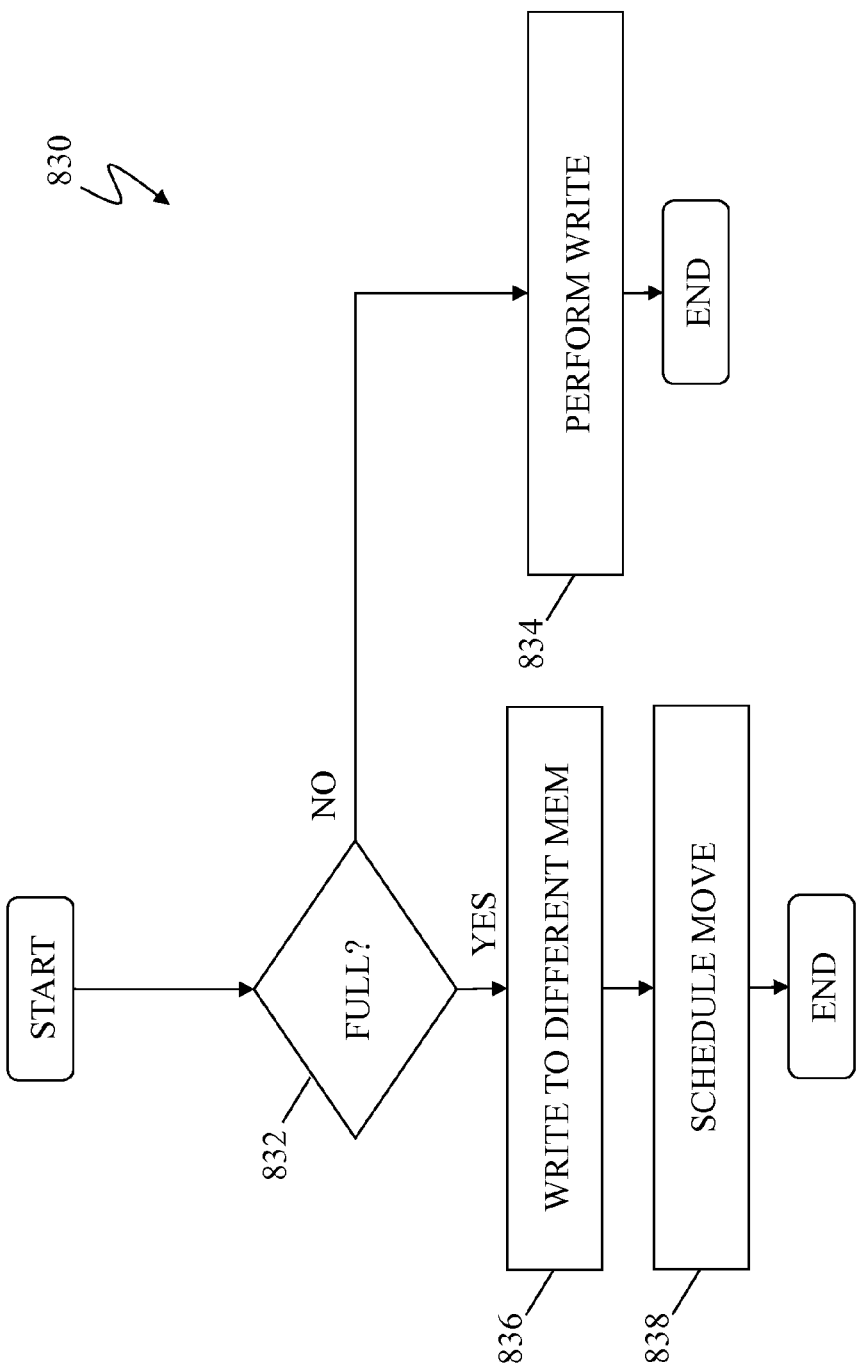

FIG. 14 is a flowchart 830 that illustrates an alternative embodiment for handling write operations to a storage tier that may be full. Processing begins at a first test step 832 where it is determined if the storage tier is full. If not, then control passes from the test step 832 to a step 834 where the data is written to the storage tier. Following the step 834, processing is complete.

If it is determined at the test step 832 that the storage tier is full, then control passes from the test step 832 to a step 836 where the data is written to a different storage area, such as a lower (or higher) storage tier or to global memory of the storage device (e.g., cache memory), as further discussed herein. The data may be placed in the different storage area temporarily. Following the step 836 is a step 838 where the data is scheduled to be moved to the appropriate storage area (the originally-destined storage tier). Following the step 838, processing is complete.

In an embodiment, at the step 836, the write data may be temporarily stored in a global memory, such as the global memory 46, until storage space in the particular requested tier becomes available that is sufficient to handle the write request. At the step 838, scheduling for the movement of the data may include relocating data in the particular requested tier, e.g. "faster" storage tier, to a lower tier, e.g. "slower" storage tier, to make memory available for the data temporarily stored in the global memory. In another embodiment, at the step 836, data for the requested write may be immediately written to a lower tier than that requested for the write and, at the step 838, a future promotion of the data to the particular requested higher tier (originally-destined storage tier) may be scheduled. The embodiments discussed herein provide for the dynamic re-allocation and re-ordering of data to accommodate write policies, usage patterns and the like.

Figure 15:
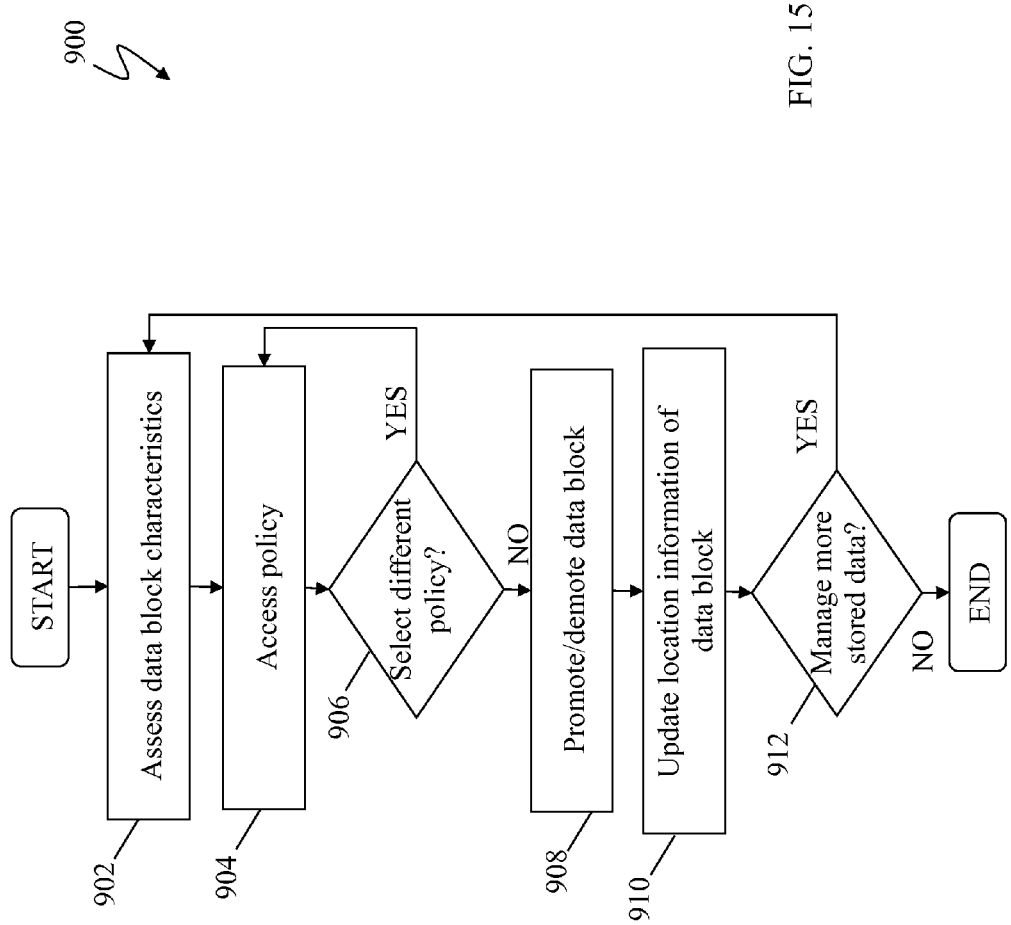

FIG. 15 is a flowchart 900 of processes for promoting and demoting data blocks in a fine grained tiered storage system according to an embodiment of the system described herein. At a step 902, characteristics of a data block are assessed or otherwise determined. As further discussed elsewhere herein, characteristics may include access frequency of the data block, time of last access or use, information associated with particular users of the data block and/or other characteristics and statistics information. The characteristics may be assessed periodically, at a determined time, after the occurrence of a trigger event and/or based on some other criteria. After the step 902, processing proceeds to a step 904 where a policy is accessed related to promotion and/or demotion of data blocks between multiple storage tiers. Policies may be accessed automatically or manually as discussed elsewhere herein and include such policies as LRU, MFU, predictive policies and/or special purpose policies. After the step 904, processing proceeds to a test step 906 where it is determined if a different policy is to be selected. In some instances, it may be useful to be able to dynamically select the policy to be used based on characteristics of the data and/or some other criteria, such as dynamic run time conditions. For example, a first policy may be used for tier 4 data that was recently moved from tier 3 while a second policy may be used for tier 4 data that has been tier 4 data for a relatively long period of time. If a different policy is to be selected, processing proceeds back to the step 904. Otherwise, processing proceeds to a step 908.

At the step 908, data blocks are to be promoted and/or demoted according to the one or more policies. If a data block is promoted, the data block is moved to a storage area (device) in a pool of storage of a higher storage tier, for example faster storage. If a data block is to be demoted, the data block is moved to a storage area (device) in a pool of storage of a lower storage tier, for example slower storage. As further discussed elsewhere herein, in some cases, the promotion and/or demotion procedure may include moving copies of data blocks to other storage tiers and the deleting the old data blocks from their original storage location and/or copies of data blocks previously stored at the subsequent storage tiers may be used and "movement" of the data block is to make the previously-stored version of the data block become again the current, accessible data block.

After the step 908, processing proceeds to a step 910 where information concerning the location of the data block is updated in a table of information in the thin device, as further discussed elsewhere herein. After the step 910, processing proceeds to a test step 912 where it is determined whether additional stored data is to be managed according to the system described herein. If more stored data is to be managed (promoted/demoted), processing proceeds back to the step 902. Otherwise, processing is complete. Note that data access may be guaranteed even while data is being moved from one tier to another.

In principal, the advantages of a multi-tiered configuration increase as the size of the storage portions for which optimal tier selection are performed decreases. However, the use of smaller portions may result in the need to determine optimal placement for a significant number (e.g., billions) of regions. Thus, there are challenges presented in connection with scaling a tiering system for a relatively large storage area. In the system described herein, the overall process of optimizing tier usage is divided into a movement policy determination operation and an operation that applies the movement policy (moves the storage regions to the optimal tier for that region per the movement policy), in such a way that the movement policy determination operation can, if desired, be executed on processing hardware separate from that used by the movement policy application operation. For example, in some embodiments, the movement policy application operation may execute on a storage array containing the data and the movement policy determination operation may execute on a processing complex that is separate from the storage array, so that the movement policy determination operation can take advantage of larger processing and/or memory capacity than is available on the storage array. The system described herein provides that the movement policy may specify the preferred tier for a region of storage as a (statically defined) function of the host access rate (or other metrics) for the storage region. This allows a given instance of the movement policy to have longer useful life than a movement policy that specifies the preferred tier of a region of storage simply as a function of the logical address of the region since, with the system described herein, the preferred tier for a given region can change as a result of a change in the host access rate (or other metrics) for the region, even without a change to the movement policy. Furthermore, such a movement policy enables embodiments in which the movement policy determination operation can be performed without needing an input indicating which tier a given storage region is currently mapped to. Note that the movement policy determination and movement policy application operations may in turn be implemented in a distributed fashion in a given embodiment and, as will be discussed herein, may be optimized to minimize execution time and to minimize the adverse impacts of storage movement on storage system performance.

As discussed elsewhere herein, policies may be used to determine when to promote data (map the data to a relatively faster tier) and when to demote data (map the data to a relatively slower tier). In an embodiment herein, each of the storage portions may correspond to an extent, where each extent corresponds to forty-eight sub-extents, and each sub-extent corresponds to ten chunks and each chunk corresponds to twelve tracks, so that an extent includes four hundred and eighty chunks (five thousand seven hundred and sixty tracks). Note also that, for the same logical device, different ones of the extents may have different sizes. Note also that the storage space may be one or more of a single logical device, a group of logical devices, all logical devices corresponding to particular physical space, logical devices corresponding to a particular application or set of application, etc.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

As discussed elsewhere herein, the data devices 61-67 (and other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The data devices 61-67 may or may not appear to a host coupled to the storage array 124 as a logical volumes (logical devices) containing a contiguous block of data storage, as discussed herein. Accordingly, each of the data devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume.

In accordance with techniques herein, an embodiment may allow for locating all of the data of a single logical portion or entity in a same tier or in multiple different tiers depending on the logical data portion or entity. In an embodiment including thin devices, the techniques herein may be used where different portions of data of a single thin device may be located in different storage tiers. For example, a thin device may include two data portions and a first of these two data portions may be identified as a "hot spot" of high I/O activity (e.g., having a large number of I/O accesses such as reads and/or writes per unit of time) relative to the second of these two portions. As such, an embodiment in accordance with techniques herein may have added flexibility in that the first portion of data of the thin device may be located in a different higher performance storage tier than the second portion. For example, the first portion may be located in a tier comprising flash devices and the second portion may be located in a different tier of FC or SATA drives.

Data used in connection with techniques herein, such as the performance data of FIG. 3 used in determining response time and/or other performance metrics for physical device(s), may be obtained through observation and monitoring actual performance with respect to read and write requests or commands from the DA, controller or other backend physical device interface.

It should be noted that movement of data between tiers from a source tier to a target tier may include determining free or unused storage device locations within the target tier. In the event there is an insufficient amount of free of unused storage in the target tier, processing may also include displacing or relocating other data currently stored on a physical device of the target tier. An embodiment may perform movement of data to and/or from physical storage devices using any suitable technique. Also, any suitable technique may be used to determine a target storage device in the target tier where the data currently stored on the target is relocated or migrated to another physical device in the same or a different tier.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

As described above, a thin device (also referred to as a virtually provisioned device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device may be constructed of chunks having a size that may vary with embodiment. For example, in one embodiment, a chunk may correspond to a group of 12 tracks (e.g., 12 tracks*64 Kbytes/track=768 Kbytes/chunk). As also noted with a thin device, the different chunks may reside on different data devices in one or more storage tiers. In one embodiment, as will be described below, a storage tier may consist of one or more storage pools. Each storage pool may include multiple logical devices which are data devices and their associated physical devices. With thin devices, a system in accordance with techniques herein has flexibility to relocate individual chunks as desired to different devices in the same as well as different pools or storage tiers. For example, a system may relocate a chunk from a flash storage pool to a SATA storage pool. In one embodiment using techniques herein, a thin device can be bound to a particular storage pool of a storage tier at a point in time so that any chunks requiring allocation of additional storage, such as may occur when writing data to the thin device, result in allocating storage from this storage pool. Such binding may change over time for a thin device.

Figure 16A:
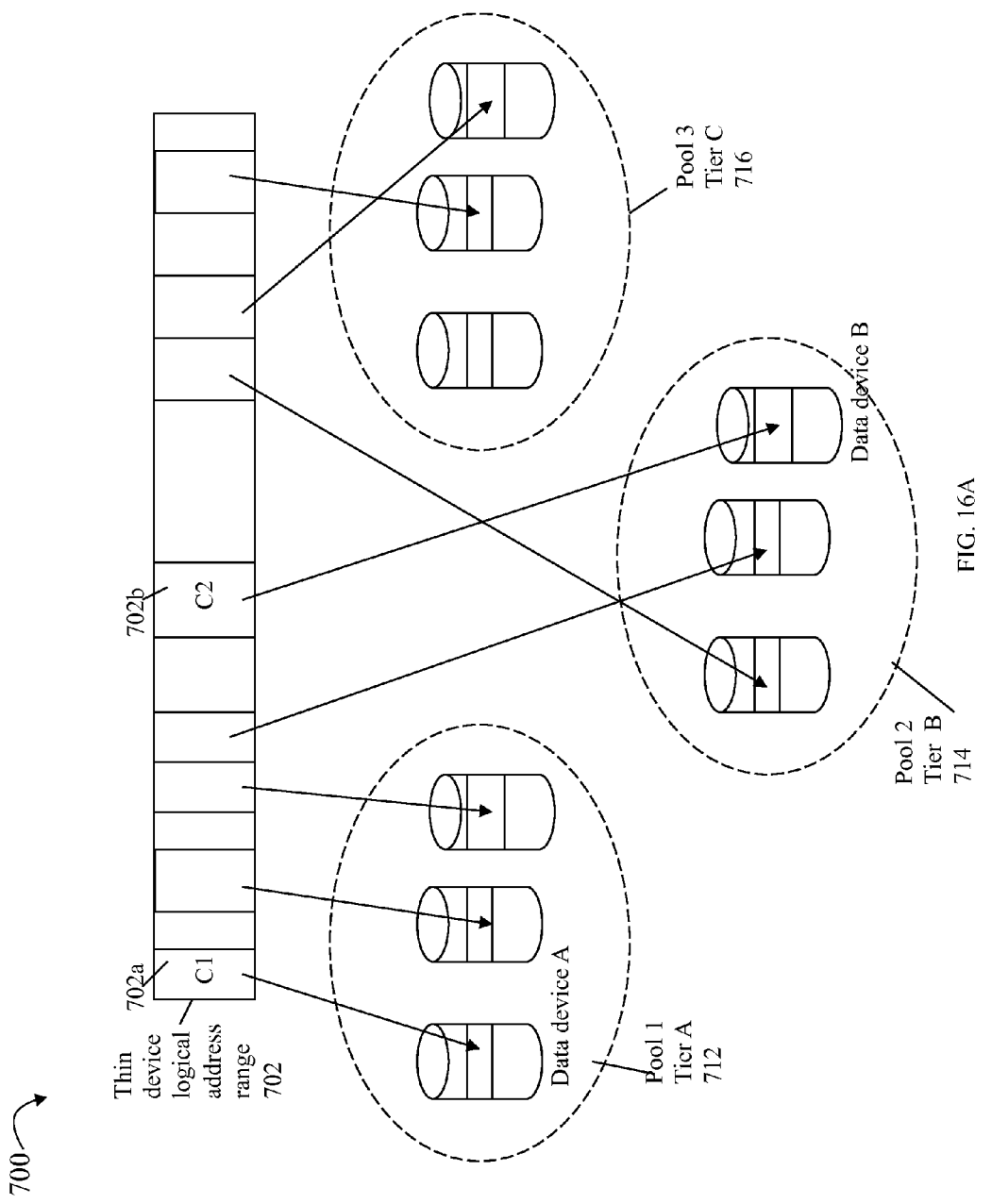
FIGS. 16A and 16B are examples illustrating thin devices and associated structures that may be used in an embodiment in accordance with techniques herein.

Referring to FIG. 16A, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of FC storage devices, and pool 716 may represent a storage pool of tier C of SATA storage devices. Each storage pool may include a plurality of logical devices (which are data devices) and associated physical devices (or portions thereof) to which the logical devices are mapped. Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Figure 16B:
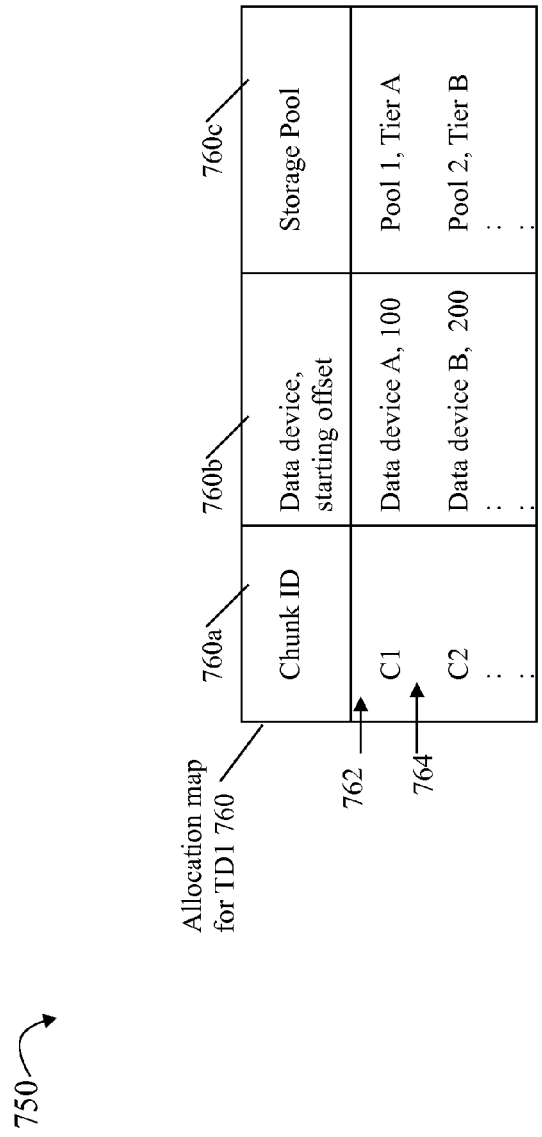

Referring to FIG. 16B, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 16A such as in connection the mapping of 702 to different storage pool devices. The allocation map 760 may contain an entry for each chunk and identify which logical device or data device and associated physical storage is mapped to the chunk. For each entry or row of the map 760 corresponding to a chunk, a first column 760a, Chunk ID, denotes an identifier to uniquely identify the chunk of the TD, a second column 760b, indicates information about the data device and offset to which the chunk is mapped, and a third column storage pool 760c denotes the storage pool and tier including the data device of 760b. For example, entry 762 represents chunk C1 illustrated in FIG. 16A as 702a and entry 764 represents chunk C2 illustrated in FIG. 16A as 702b. It should be noted that although not illustrated, the allocation map may include or otherwise use other tables and structures which identify a further mapping for each data device such as which physical device locations map to which data devices. This further mapping for each data device, as well as other logical devices generally, is described and illustrated elsewhere herein such as, for example, with reference back to FIG. 5B. Such information as illustrated and described in connection with FIG. 16B may be maintained for each thin device in an embodiment in accordance with techniques herein.

In connection with performing I/O operations, such as writes as well as reads, a data storage system in an embodiment in accordance with techniques herein may use a cache in order to improve performance.

In connection with collecting statistics or metrics characterizing performance, workload and/or activity for a thin device, one approach may be to collect the information per chunk or, more generally, for the smallest level of granularity associated with allocation and de-allocation of storage for a thin device. Such statistics may include, for example, a number of reads/unit of time, # writes/unit of time, a number of pre-fetches/unit of time, and the like. However, collecting such information at the smallest granularity level may not scale upward as number of chunks grows large such as for a single thin device which can have up to, for example 300,000 chunks.

Therefore, an embodiment in accordance with techniques herein may collect statistics on a grouping of "N" chunks also referred to as an extent, where N represents an integer number of chunks, N>0. N may be, for example, 480 in one embodiment. Each extent may represent a consecutive range or portion of the thin device in terms of thin device locations (e.g., portion of the address space or range of the thin device). Note that the foregoing use of consecutive does not refer to physical storage locations on physical drives but rather refers to consecutive addresses with respect to a range of addresses of the thin device which are then mapped to physical device locations which may or may not be consecutive, may be on the same or different physical drives, and the like. For example, in one embodiment, an extent may be 480 chunks (N=480) having a size of 360 MBs (megabytes).

An extent may be further divided into sub extents, where each sub extent is a collection of M chunks. M may be, for example 10 in one embodiment. In one embodiment, the sub-extent size may correspond to the smallest granularity of data movement. In other words, the sub extent size represents the atomic unit or minimum amount of data that can be operated upon when performing a data movement such as between storage tiers.

Figure 16C:
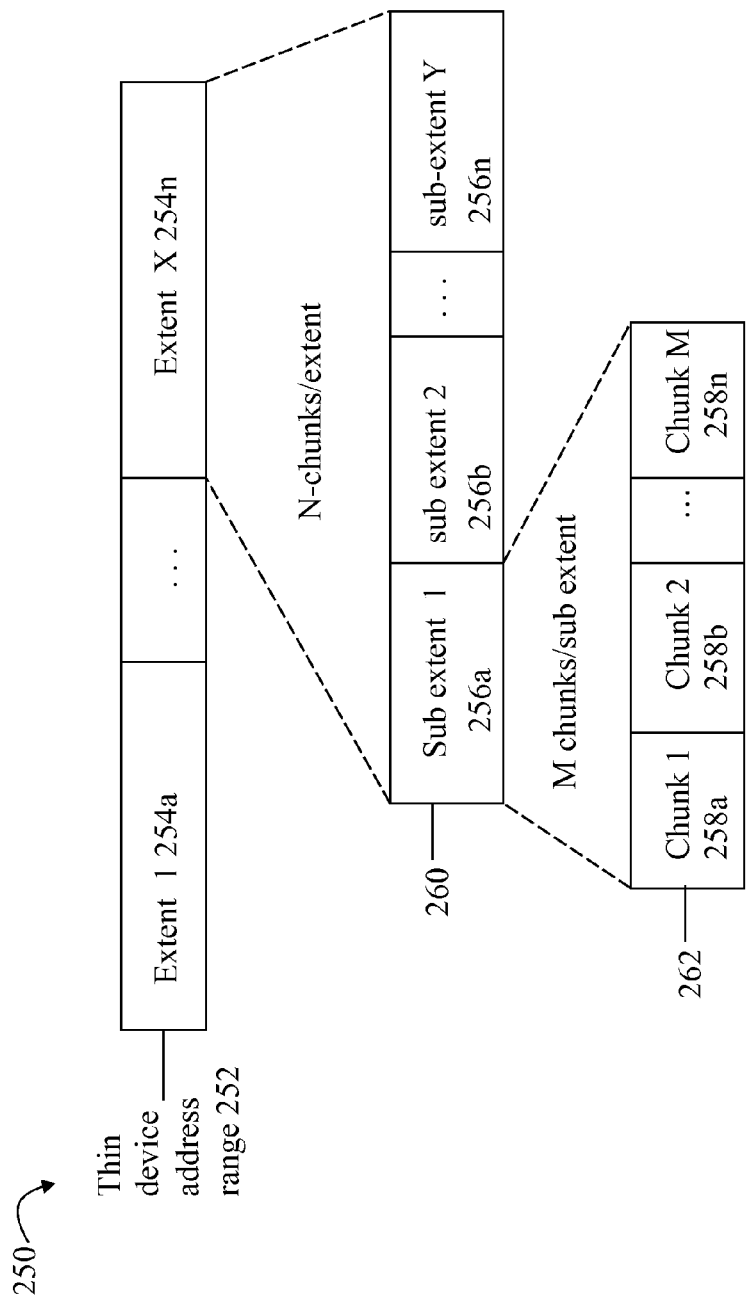
FIG. 16C is an example of how a thin device logical address range may be partitioned in an embodiment in accordance with techniques herein.

Referring to FIG. 16C, shown is an example illustrating partitioning of a thin device's address space or range in an embodiment in accordance with techniques herein. The example 250 includes a thin device address space or range 252 which, as described elsewhere herein, includes chunks mapped to physical storage locations. The thin device address space or range 252 may be partitioned into one or more extents 254a-254n. Each of the extents 254a-254n may be further partitioned into sub-extents. Element 260 illustrates that extent X 254n may include sub extents 256a-256n. Although only detail is illustrated for extent 254n, each of the other extents of the thin device also includes a same number of sub extents as illustrated for 254n. Each of the sub extents 256a-256n may represent a grouping of "M" chunks. Element 262 illustrates that sub extent 1 256a may include chunks 258a-258n. Although only detail is illustrated for sub extent 256a, each of the other sub extents 256b-256n also includes a same number of "M" chunks as illustrated for 256a. Thus, each of the extents 254a-254n may represent an grouping of "N" chunks, where N=# sub extents/extent*M chunks/sub extent An embodiment in accordance with techniques herein may collect statistics for each extent or other suitable level of granularity.

As described herein, a storage tier may include storage devices which are rotating disk drives. A rotating disk drive includes a disk platter containing the data and a drive head that reads and writes data as the disk platter spins past. The drive head is mounted on a disk arm that positions the head radially with respect to the disk platter according to the location of data on the disk platter. Read and write times, and thus performance of the drive, is a function of the time required to move the drive head to the correct location as well as the time required to spin the disk so that the data is accessible by the drive head. Accordingly, performance of a drive (and/or many other types of disk drives) may be enhanced by reducing the time for drive head movement and/or the time for spinning the disk platter.

Figure 17:
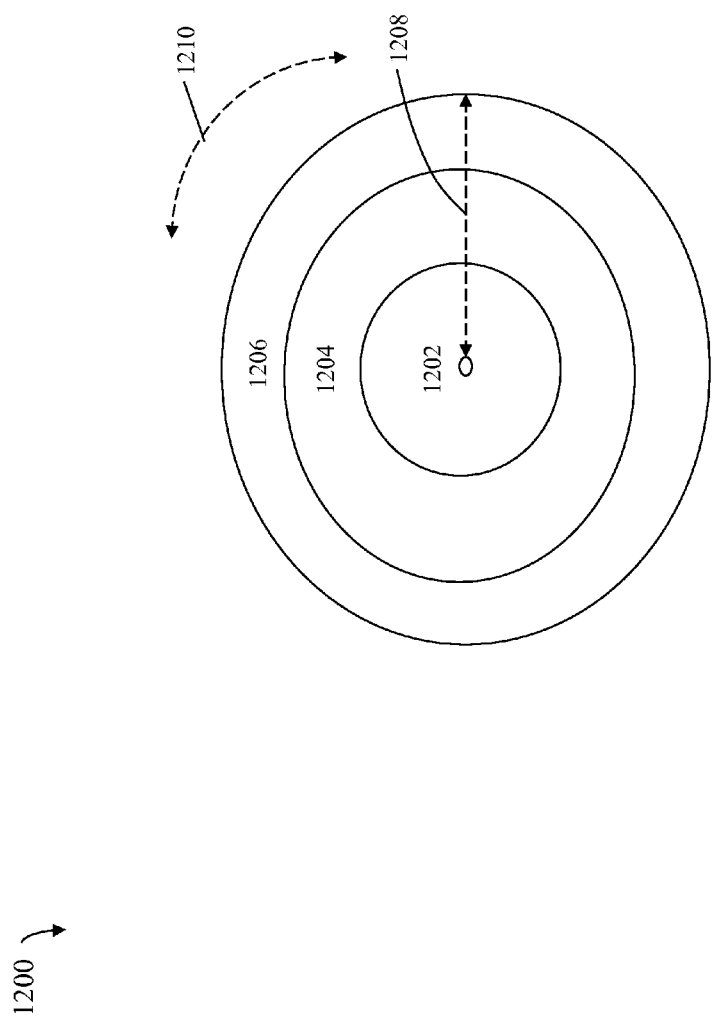
FIGS. 17 and 17C are examples illustrating a rotational disk drive platter that may be used in an embodiment in accordance with techniques herein.

Referring to FIG. 17, shown is an example illustrating a rotational disk drive. To position the head to a particular location on the drive platter, the head may move radially 1208 and also rotate 1210 about a circumference at a particular radial distance from the center of the drive. As known in the art, seek latency may refer to the amount of time it takes to position the drive head to a desired radial distance from the center of the drive, and rotational latency may refer to the amount of time it talks to position the drive head to a desired rotational position about a circumference at the desired radial distance from the center of the drive.

Figure 17A:
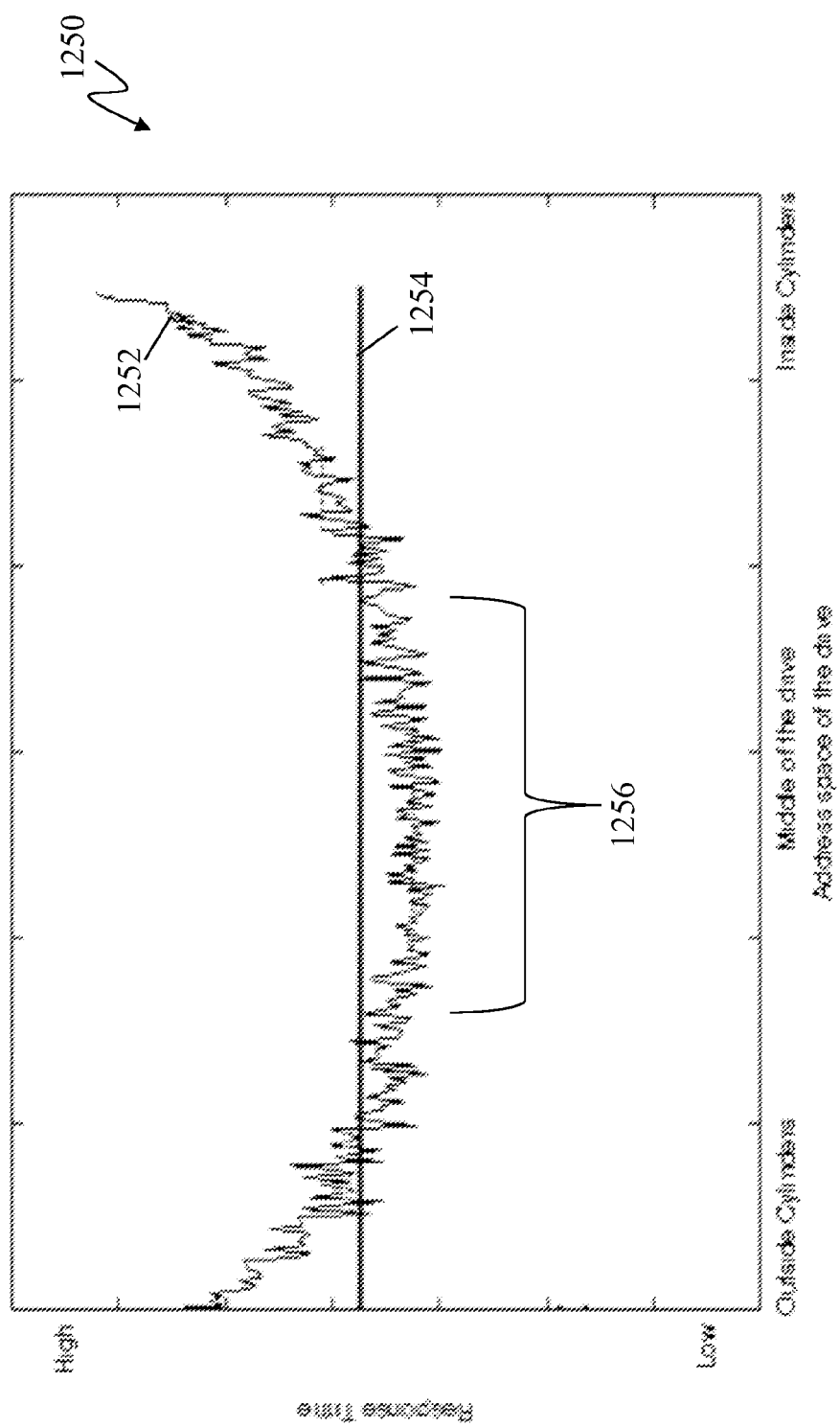
FIGS. 17A, 17B and 18 are charts illustrating response times for I/Os to various regions of the disk drive platter.

Referring to FIG. 17A, a chart 1250 shows a plot 1252 of average read/write response time for a disk drive vs. the location of data on the disk platter. The vertical axis of the chart 1250 represents response time while the horizontal axis represents location of the data on the disk platter, where the far left corresponds to data located in the outer cylinders of the platter while the far right represents data located near the center of the platter. A line 1254 corresponds to an average response time for all of the data on the disk drive.

The chart 1250 represents response times when data is randomly distributed throughout the disk platter. Nonetheless, the response time is less than average for a portion 1256 of the plot 1252 corresponding to data stored in a middle section of the disk platter (i.e., a section between the inside cylinders and the outside cylinders of the platter). Note that, for data stored in the middle section of the platter, the maximum distance and the average distance travelled by the disk arm is less than the maximum and average distance the disk arm travels for data stored at either the outer cylinders or the inner cylinders.

Figure 17B:
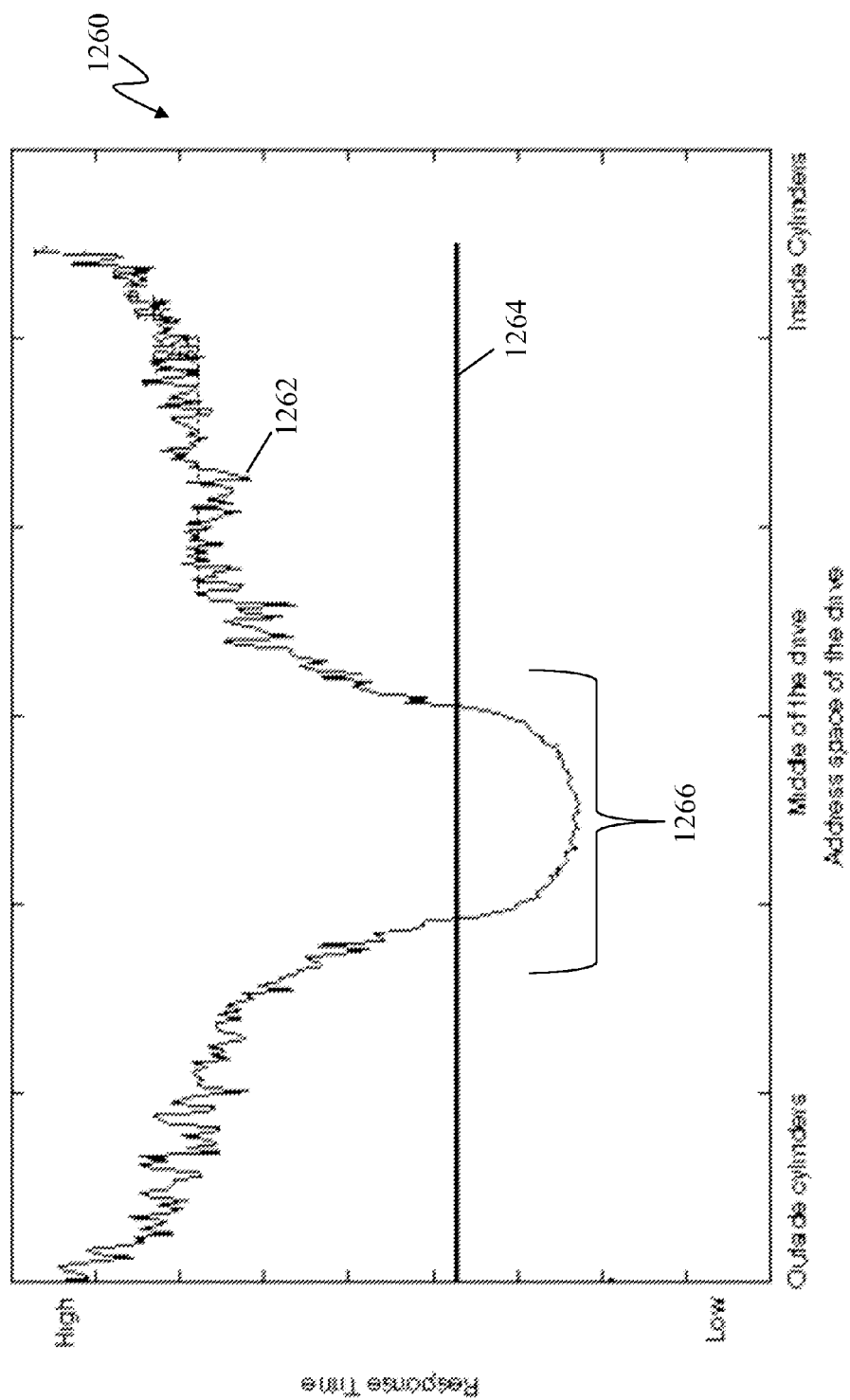

Referring to FIG. 17B, a chart 1260 shows a plot 1262 of average read/write response time for a disk drive vs. the location of data on the disk platter. The chart 1260 is similar to the chart 1250. A line 1264 corresponds to an average response time for all of the data on the disk drive. The response time is less than average for a portion 1266 of the plot 1262 corresponding to data stored in a middle section of the disk platter.

The chart 1260 is different from the chart 1250 in that the portion 1266 of the plot 1262 shows response times significantly lower than the average response time when compared with the portion 1256 of the plot 1252. That is, the difference between the average response time and the response times for the portion 1266 of the plot 1262 is significantly greater than the difference between the average response time and the response times for the portion 1256 of the plot 1252. Unlike the plot 1252 where the data is distributed randomly on the disk platter, the plot 1262 represents data being distributed on the platter so that more frequently accessed data is stored in the middle section of the platter while less frequently accessed data is stored at the inside and outside cylinders of the platter.

Note that the average distance travelled by the disk arm is decreased for data stored in the middle section of the disk platter when it becomes more likely that the disk arm is travelling from a location in the middle section of the platter. That is, providing frequently accessed data in the middle section of the platter causes the disk arm to travel less by increasing the likelihood that the arm will travel from a location in the middle section of the platter to a relatively close location in the middle of the platter.

Techniques may be used which take advantage of the differences in seek and rotational latency in connection with storing data at different physical portions or regions of the physical disk drive platter. For example, some techniques are described in U.S. patent application Ser. No. 13/435,360, filed Mar. 30, 2012, Drive Partitioning for Automated Storage Tiering, Burke et al., (the '360 application) which is incorporated by reference herein.

As described in the '360 application, data may be stored at various physical portions of the drive platter. For example, data may be stored in the middle portion 1204 of the drive platter. When performing an operation to read from, or write data to, the drive, the drive head moves within a narrow radial distance/range corresponding to the middle portion 1204/middle radial distance thereby limiting the seek latency. More frequently accessed data may be stored, for example, in the middle portion 1204 of the drive and less frequently accessed data may be stored at the inner 1202 and outer 1206 portions of the drive. In this case, when the drive head has a current seek position or radial position corresponding to that of the middle portion 204 of the drive and there is then an I/O operation to read or write data to any of the inner 202 or outer 206 drive portions, the additional seek time is, at worst case, approximately ½ of the radial distance.

What will now be described are techniques that may be used to increase performance of disk drives by ordering or storing data at a particular physical region of the drive based on expected access frequency. Techniques are described in following paragraphs which exploit a fact that there may be large portion of user data that is rarely or typically infrequently accessed and attempt to ensure that a majority of the I/O operations are performed with respect to data stored in an ideal region of the drive. The ideal region is described in more detail below.

Figure 17C:
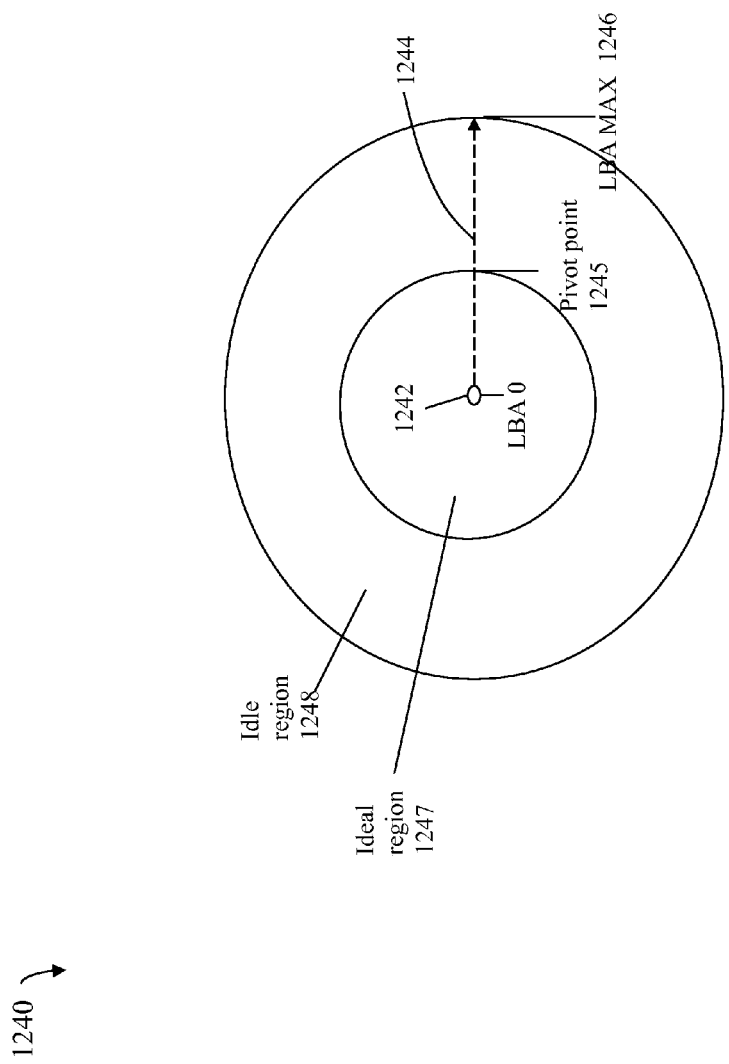

With reference now to FIG. 17C, a physical drive may be partitioned into two regions referred to herein as the ideal region 1247 and the idle region 1248 (which is that remaining physical portion of the physical drive which is not included in the ideal region). The partitioning may be based on a particular physical radial distance from the center of the drive also referred to herein as the pivot point 2145. The physical drive may be used to store data corresponding to an LBA (logical block address) or offset range from 0 to MAX LBA, inclusively, whereby 0 denotes the LBA or offset on the physical drive of the first block of data stored on the physical drive beginning at the center of the drive (e.g., 0 radial distance) and MAX LBA denotes the LBA or offset on the physical drive of the last block of data stored on the drive at the outermost radial distance on the drive. Line 1244 is a radial line drawn from the center 1242 of the physical drive to the outermost cylinder of the drive denoting that LBA or offset 0 corresponds to the innermost cylinder of the drive and LBA or offset MAX corresponds to the outermost cylinder or radial location 1246 of the drive. Line 1244 denotes that data may be stored at a logical block address or offset whereby the higher the LBA or offset, the farther the radial distance from the center of the drive. The physical drive may be characterized as having a capability of storing a maximum amount of data at MAX LBA.

In this manner, the pivot point 1245 may correspond to a particular LBA (logical block address) or offset on the physical drive having a particular radial distance from the center of the drive 1242. The partitioning of the physical drives into the foregoing two regions 1247, 1248 may be based on the pivot point 1245 which can vary for different drives depending on the particular servo-mechanical addressing mechanism of a drive.

Figure 18:
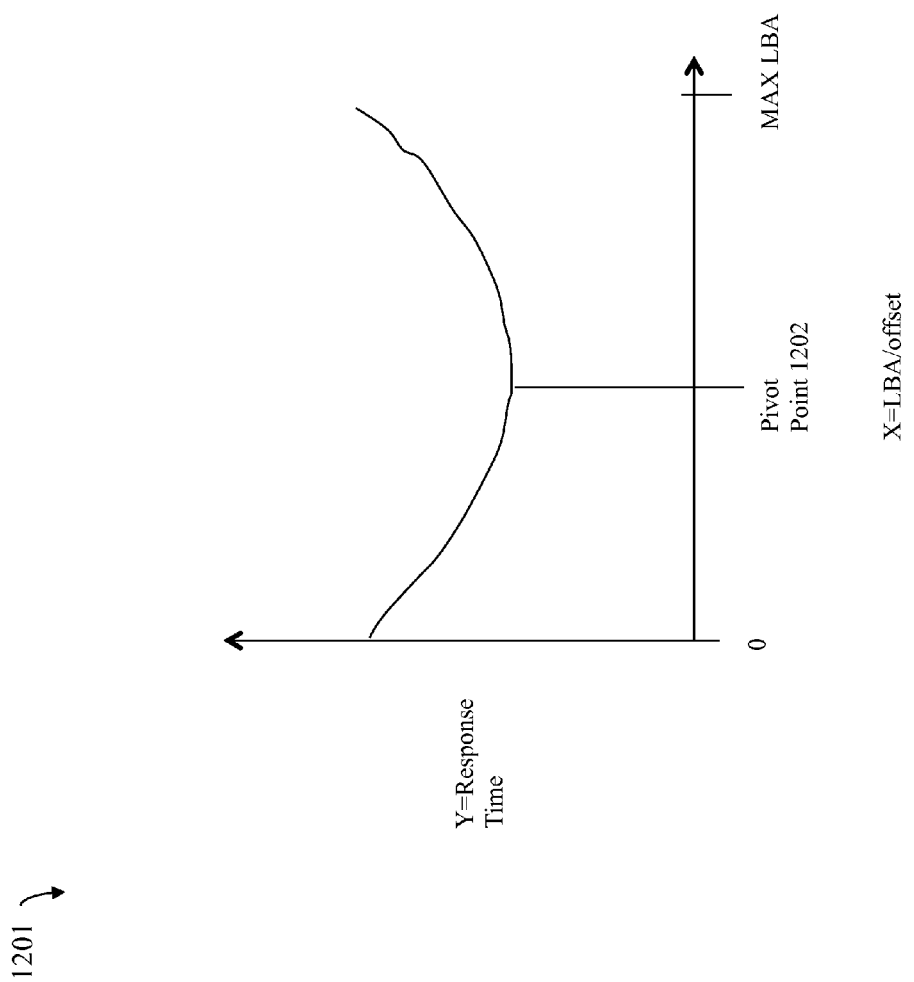

Referring to FIG. 18, shown is an example 201 illustrating how a pivot point may be determined in an embodiment in accordance with techniques herein for a physical drive. The example 201 is a graphical illustration where the LBA or offset of the physical drive is indicated on the X axis and a corresponding response time (RT) is indicated on the Y axis. On the X axis, the far left corresponding to LBA or offset 0 denotes data located at the innermost cylinder or radial position on the disk drive and the far right corresponds to MAX LBA or offset denotes data located at the outermost cylinder or radial position on the disk drive. The graph 201 represents RTs observed with a random I/O pattern or workload whereby I/Os (e.g., read and write operations) are directed to physical locations on the drive which are randomly distributed (e.g., each offset being equally probable) throughout the LBA or physical offset range of the drive.

Determination of a pivot point may be found for a particular physical drive through experimentation and testing by issuing such I/Os directed to random physical locations on the disk drive to obtain data as represented in FIG. 18. The inventors have found that typically the pivot point is approximately 40% for most drives where 100% represents the maximum physical offset or LBA on the drive at the outermost physical drive location where data is stored (e.g., 100% represents the maximum usable capacity of the physical drive). An embodiment may choose to use a default value, such as 40%, as the pivot point which is suitable for most drives. In following paragraphs, a pivot point of 40% may be used as a particular value for illustration purposes.

In this case, the physical drive may have data stored at offsets or LBAs whereby 0% corresponds to the innermost cylinder or physical drive offset at which data is stored on the drive and 100% corresponds to the outermost cylinder or physical drive offset at which data is stored on the drive. The ideal region may be generally defined as an inner portion of a drive corresponding to the range of 0% to 40%, inclusively, and the idle region may be defined as the outer portion of the drive corresponding to the range of 41% to 100%, inclusively.

Generally, techniques are described herein in which data may be stored at particular physical device locations according to an expected level of access or workload. Data portions which are expected to be more frequently accessed may be stored in the ideal region and data portions which are less frequently accessed or idle may be stored in the idle region once the ideal region storage has been consumed, or nearly consumed. Data portions may be migrated between the two regions as expected access levels may change over time. Additionally, as described in more detail below, storage within each of the ideal and idle regions may be consumed or allocated in accordance with a defined allocation flow. Following paragraphs describe use of techniques herein with thin or virtually provisioned logical devices. However, as will be appreciated by those skilled in the art, such techniques are not so limited to use with only thin devices and may generally be used with any suitable logical device and when placing data on a physical drive.

When allocating physical storage from the ideal region for thin device chunks, storage may be allocated starting at the pivot point and moving towards 0% (e.g., moving toward the inner most portion of the drive). When allocating physical storage from the idle region for thin device chunks, storage may be allocated starting at the pivot point and moving towards 100% (e.g., moving toward the outermost portion of the drive).

Figure 19:
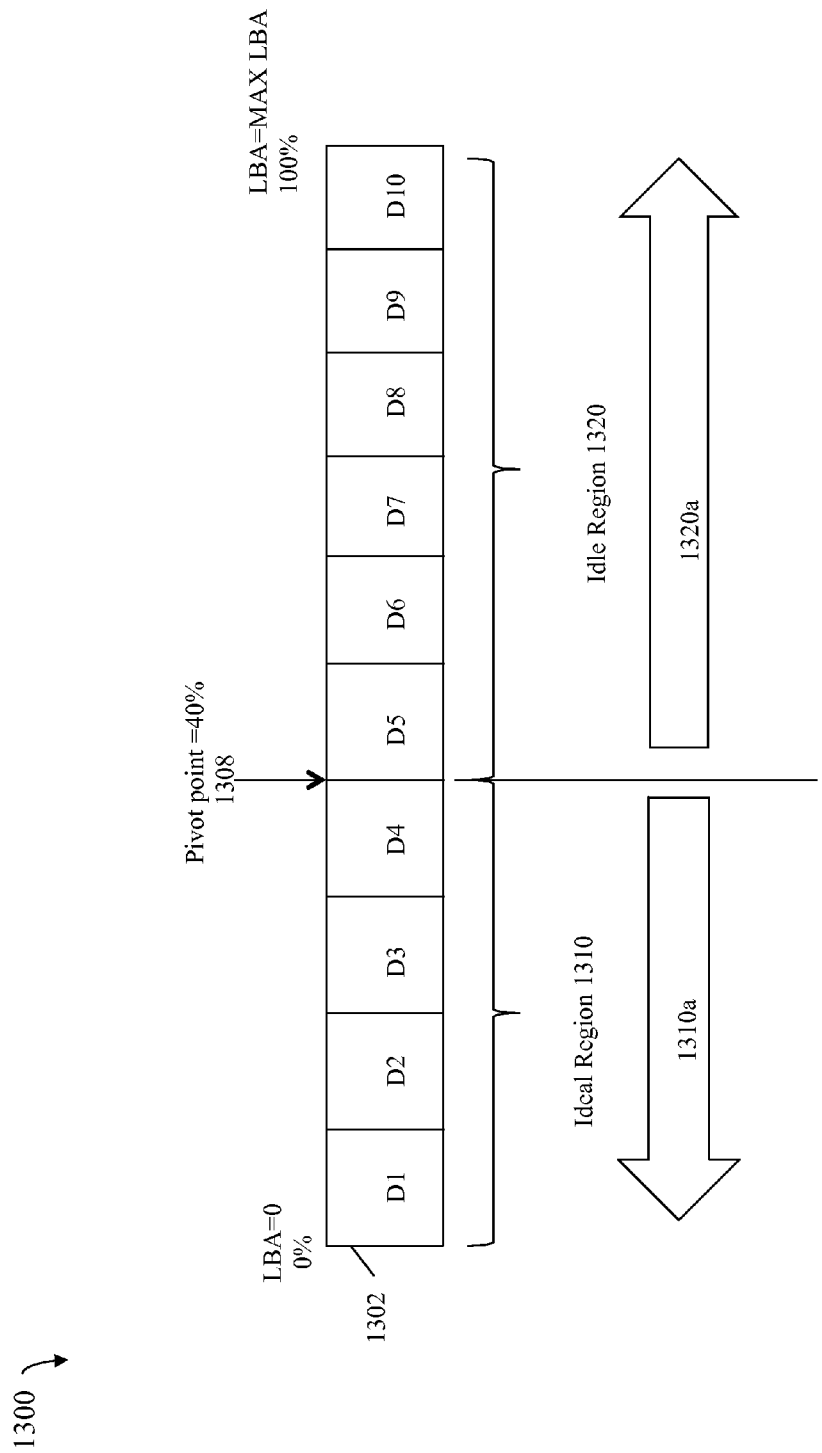
FIG. 19 is an example illustrating allocation flow in an embodiment in accordance with techniques herein.

The foregoing general allocation flow when allocating storage for thin device chunks is illustrated in FIG. 19.

Referring to FIG. 19, shown is an example illustrating an allocation flow when allocating storage for use with thin devices in an embodiment in accordance with techniques herein. The example 1300 includes the LBA or offset range 1302 whereby the LBA or offset range and corresponding percentage range are shown. An exemplary pivot point of 40% is represented as 1308. Element 1310 represents the ideal region and element 1320 represents the idle region. Element 1310a represents the allocation flow of physical storage from the ideal region 1310 when allocating storage for thin devices. Element 1320a represents the allocation flow of physical storage from the idle region 1320 when allocating storage for thin devices.

Consistent with description elsewhere herein, one or more data devices (which are logical devices), or portions of the logical address spaces thereof, may be mapped to the physical drive's LBA or offset range 1302. For example, element 1302 is partitioned into 10 areas denoted as D1-D10 where each of the different 10 areas may denote an area of the physical device mapped to a different logical data device. In this manner, when allocating storage for thin device data portions, allocation may be made using the data device that is mapped to the appropriate portion of the physical drive.

When allocating storage for a chunk or data portion of a thin device which is either known to be active (e.g., frequently accessed) or has an unknown level of activity or workload, storage is allocated from the ideal region in accordance with the foregoing allocation flow 1310 (e.g., the next available physical storage location where the allocation flow indicates the preferred order or precedence in which physical storage is allocated for thin devices). In this case, there is an assumption that if a data portion has an unknown level of activity or workload, then the data portion is initially assumed to be active. A data portion's activity or workload may be unknown, for example, when data is first written and a sufficient amount of time has not yet elapsed to collect performance data characterizing the data portion's workload (e.g., average number of IOPS/second, average amount of data written per unit of time (e.g., bytes/second), and the like).

When allocating storage for a chunk or data portion of a thin device which is known to have an activity level characterized as "idle", then storage for the data portion may be allocated from the idle region. Techniques that may be used to classify a data portion as active or idle are described in more detail elsewhere herein If all storage in the ideal region of a physical drive has been allocated and there is still storage remaining in the idle region, subsequent storage allocations are made from the idle region until all storage of the physical drive has been allocated. Thus, the ideal region may be used until all storage therein has been allocated and then any further allocations from the drive are made from the idle region until storage of the idle region has also been consumed. Similarly, if all storage in the idle region of a physical drive has been allocated and there is still storage remaining in the ideal region, subsequent storage allocations are made from the ideal region until all storage of the physical drive has been allocated. Thus, the idle region may be used until all storage therein has been allocated and then any further allocations from the drive may be made from the ideal region until storage of the ideal region has also been consumed.

It should be noted that an embodiment may perform allocations from a pool of physical storage devices. In this case, when all storage in the ideal regions of all physical drives of the pool has been allocated and there is still storage remaining in any idle region of any drive in the pool, subsequent storage allocations are made from such idle region(s) until all storage of the physical drives of the pool has been allocated. Similarly, if all storage in the idle regions of all physical drives of the pool has been allocated and there is still storage remaining in any ideal region of any drive of the pool, subsequent storage allocations are made from such ideal region(s) until all storage of the physical drive has been allocated.

Based on the foregoing, techniques herein may be used to allocate storage of a physical drive for use with thin devices whereby a minimal seek distance is utilized.

A benefit of using the pivot point and allocation flow just described in connection with thin device storage allocations is that the idle data may reside close to the active data in the ideal region. If the data stored in the idle region does become active, such data is still relatively close to the ideal region thereby reducing the seek time required to access the data in the idle region. Alternatively, if allocations for the idle data portions started within the idle region at 100% and moved inward toward 40% (e.g., opposite allocation flow from that illustrated by 1320a) and an I/O operation is directed to the data stored at 100%, then accessing such data stored at 100% would require positioning the drive head to the outermost radial position.

As described elsewhere herein, storage allocations such as in connection with thin devices, may be made from storage pools each including one or more physical drives. In such a case, the techniques herein may be performed with respect to all ideal regions and all idle regions viewed collectively for all drives in the pool. For example, when allocating storage for a thin device from an ideal region, such allocation may be made from any suitable physical drive in the pool. If the physical devices of the pool are configured to have a particular RAID group configuration, then the allocation may accordingly be made from multiple drives forming a RAID group. Examples herein may be made with reference to a single physical drive for simplicity of illustration. However, it will be appreciated by those skilled in the art that such examples may be readily extended and generalized for use with storage pools.

It should be noted that allocation and deallocation of storage may be performed in connection with any processing that may be performed. For example, for thin devices in a data storage system providing for automated data movement optimizations such as between storage tiers, allocation and/or deallocation of physical storage may be performed in connection with demotion, promotion and initial allocation of storage such as the first time data is written to a logical address of a thin device.

Figure 20:
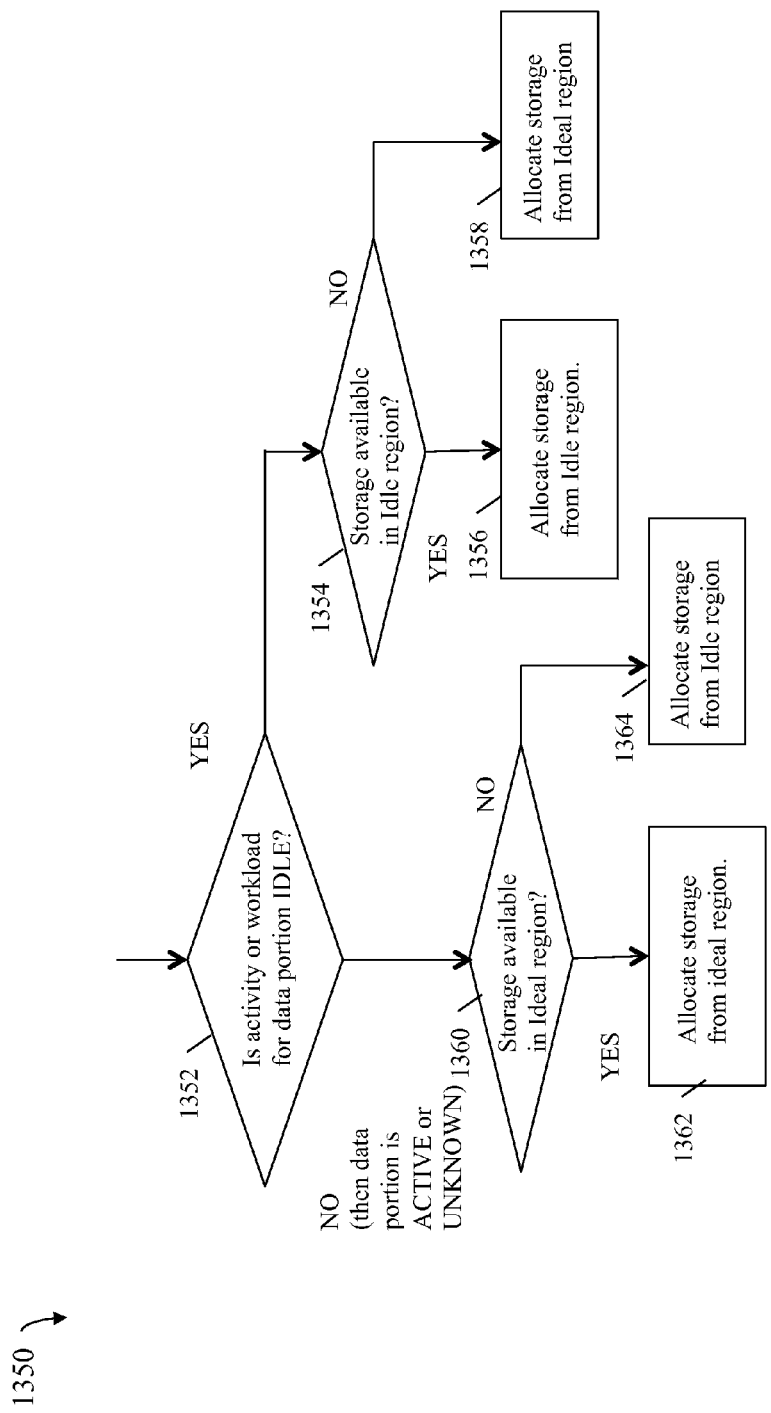

Referring to FIG. 20, shown is a flowchart of processing steps that may be performed in connection with determining from which region to allocate storage for storing a data portion. As described elsewhere herein, the allocation unit may be a chunk or more generally any other suitable allocation unit. At step 1352, a determination is made to classify the activity or workload for the data portion as being one of Idle, active or unknown. At step 1352, a determination is made as to whether the activity or workload for the data portion is idle. If step 1352 evaluates to yes, control proceeds to step 1354 where a determination is made as to whether there is storage available for allocation from an idle region of a physical device. If step 1354 evaluates to no, control proceeds to step 1358 to allocate storage from an ideal region of a physical device. If step 1354 evaluates to yes, control proceeds to step 1356 to allocate storage from an idle region. It should be noted that if there is also no storage available in any ideal region of a physical device for allocation in step 1358, this results in an allocation error in that all physical storage (e.g., of the physical device or storage pool) has been consumed.

If step 1352 evaluates to no meaning that the data portion has a workload or activity level classified as active or unknown, control proceeds to step 1360 where a determination is made as to whether there is storage available for allocation from an ideal region of a physical device. If step 1360 evaluates to no, control proceeds to step 1360 to allocate storage from an idle region of a physical device. If step 1360 evaluates to yes, control proceeds to step 1362 to allocate storage from an ideal region. It should be noted that if there is also no storage available in any idle region of a physical device for allocation in step 1364, this results in an allocation error in that all physical storage of the physical device (or storage pool from which allocations are made) has been consumed.

Described in following paragraphs are techniques for determining whether a data portion is classified as idle using idle time counters. In one embodiment, the logical address range of the one or more data devices, such as of a storage pool, which are mapped to allocated physical device storage may be divided into partitions. Each partition may represent any suitable level of granularity. For example, in one embodiment, the size of a partition may be the size of one or more allocation/deallocation units (e.g., the amount of storage allocated/deallocated such as for thin device provisioning), an extent, subextent, and the like. For example, in one embodiment, the size of a partition for use with the histogram of 1400 of FIG. 21 (described below) may be 300 megabytes.

For each partition, an idle time counter may be maintained which provides information regarding how long it has been since an I/O was directed to the partition. Every time there is an I/O directed to the partition, the idle time counter for that partition is set to 0. The idle time counter for each partition may also be incremented by 1 on a continuous ongoing basis, such as by a continuously running background task, at each predefined time period occurrence, such as every 10 minutes or, more generally any other suitable time period.

Figure 21:
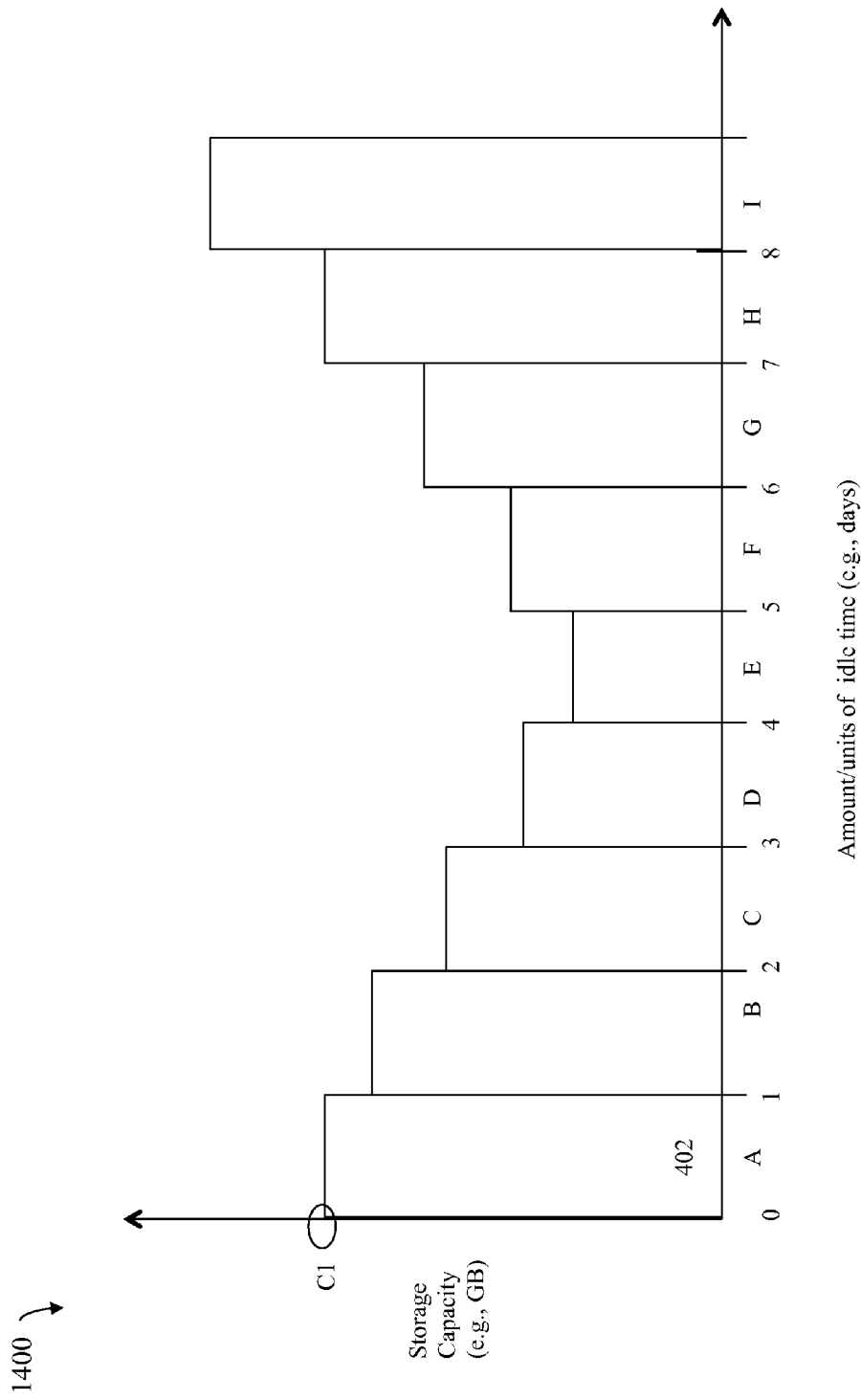
FIG. 21 is an example of a histogram that may be used in an embodiment in accordance with techniques herein.

At every occurrence of a histogram sampling interval, the idle time counters of the partitions may be analyzed to generate a histogram as in the example 4100 of FIG. 21.

Referring to FIG. 21, shown is an example of a histogram that may be used in an embodiment in accordance with techniques herein to determine a probability of a data portion being idle. In the example 1400, a histogram includes storage capacity, such in megabytes, gigabytes, or other storage unit, on the Y axis and different time units or amounts of time on the X axis.

The Y axis may represent a sum or aggregate amount of storage capacity determined to have an idle time counter denoting an amount of time that is less than the amount of time denoted on the X axis. At the occurrence of each histogram sampling interval, the distribution of idle time counters is analyzed to determine aggregated amounts of storage capacity having an idle time which falls into the particular defined time bins. In the example 1400, bins may be defined each representing a unit of time, such as 1 day where a partition is said to belong to a bin if it has an idle time counter which falls into the amount of time denoted by the bin. The example 1400 includes bin A denoting an amount of time which is less than 1 day, bin B denoting an amount of time which is equal to or greater than 1 day and less than 2 days, bin C denoting an amount of time which is equal to or greater than 2 days and less than 3 days, bin D denoting an amount of time which is equal to or greater than 3 days and less than 4 days, bin E denoting an amount of time which is equal to or greater than 4 days and less than 5 days, bin F denoting an amount of time which is equal to or greater than 5 days and less than 6 days, bin G denoting an amount of time which is equal to or greater than 6 days and less than 7 days, bin H denoting an amount of time which is equal to or greater than 7 days and less than 8 days, and bin I denoting an amount of time which is equal to or more than 8 days. The particular unit of time used for bins in the example 1400 is merely illustrative and any suitable amount of time may be used in connection with each bin.

In generating the histogram, the idle time counters of the different regions may be examined to determine which bin each idle time counter belongs. For each bin, the Y axis may reflect the aggregate or sum total storage capacity of all partitions classified as having an idle time counter within in the bin. For example, point C1 on the Y axis may represent the total sum storage capacity of all partitions having an idle time counter in bin A (e.g., less than 1 day).

Thus, in an embodiment incrementing idle time counters every 10 minutes as noted above, an idle time counter having a value of 6 denotes that the associated partition has not had an I/O operation directed to the partition for 60 minutes whereby the partition has an idle time counter falling into bin A (e.g., less than 1 day). For each idle time counter, an embodiment may perform any necessary conversion between idle time counter units and elapsed time such as just described.

Figure 22:
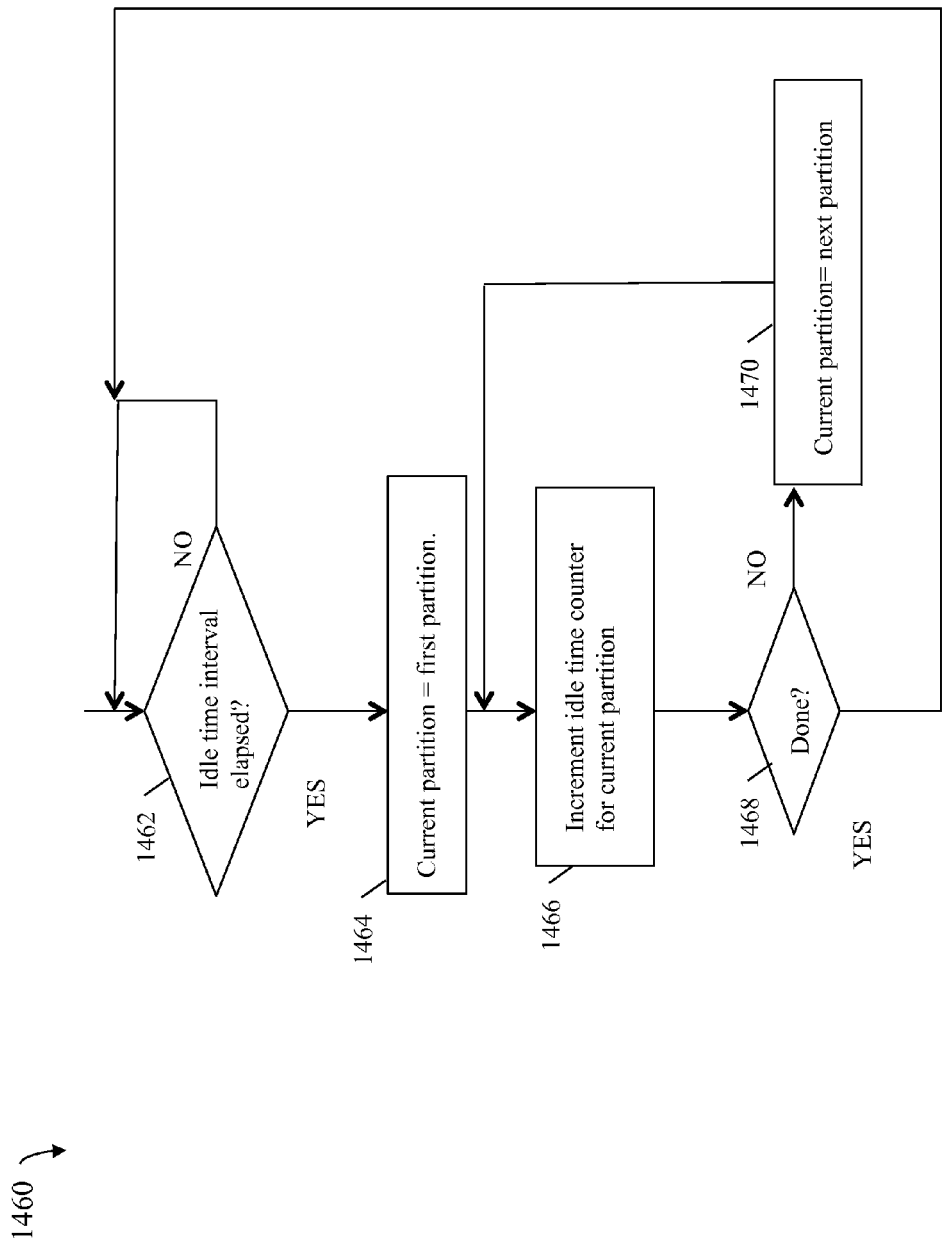

Referring to FIG. 22, shown is a flowchart of processing steps that may be performed as part of maintenance of the idle time counters. The flowchart 1460 may include processing steps performed on a continuous basis by a background process which traverses the idle time counters of all partitions upon the occurrence of each idle time interval elapsing, such as every 10 minutes. At step 1462, a determination is made as to whether an amount of time has elapsed with is equal to the idle time interval, such as 10 minutes. Processing remains at step 1462 until an amount of time equal to the idle time interval has elapsed and then processing continues with step 1464 where current partition is assigned the first partition. At step 1466, the idle time counter for the current partition is incremented by 1. At step 1468, a determination is made as to whether all idle time counters for all partitions have been traversed. If step 1468 evaluates to yes, control proceeds to step 1462 to wait for the next occurrence of the idle time interval. If step 1468 evaluates to no, control proceeds to step 1470 where current partition is assigned the next partition. Processing then continues with step 1466.

Figure 23:
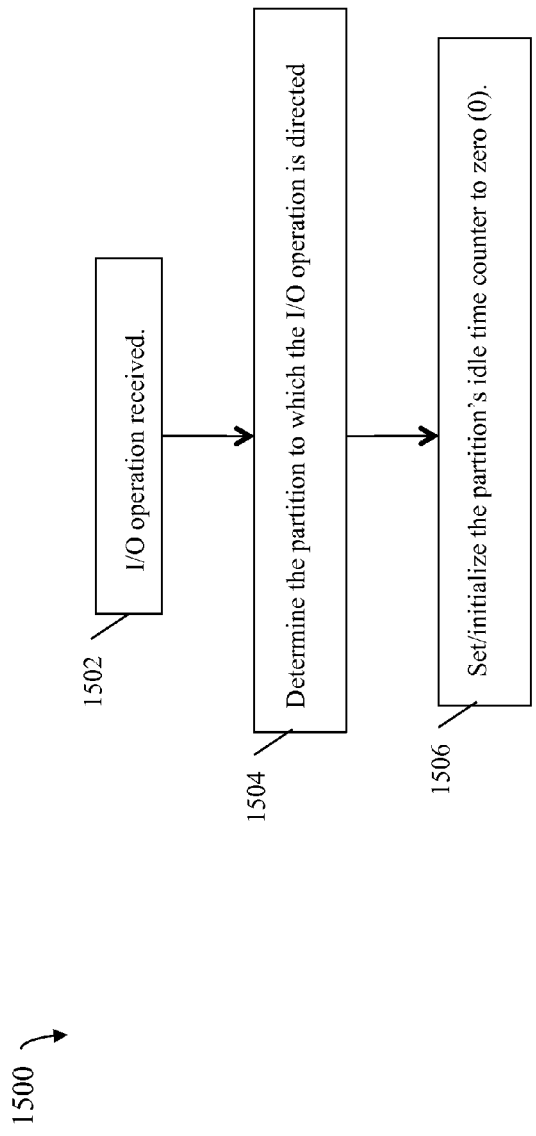

Referring to FIG. 23, shown is another flowchart of processing steps that may be performed as part of maintenance of the idle time counters. At step 1502, an I/O operation may be received. At step 1504, it is determined to which partition the I/O operation is directed. At step 1506, the idle time counter of the partition determined in step 1504 is set or initialized to zero (0).

With reference back to FIG. 21 in connection with the distribution of idle times per the histogram at each histogram sampling interval, the inventors have determined that, over time, the histogram of example 1400 tends to approximate a bimodal distribution of capacity having two distinct peaks. The histogram such as illustrated in FIG. 21 may be used in an embodiment in connection with determining when a data portion is classified as active or is otherwise idle (not active).

What will be described in following paragraphs are techniques that may be performed in an embodiment to classify a data portion as idle or active using the foregoing idle time counters. Generally, the classification of idle or active assigned to a data portion may be determined based on a threshold amount of time that a data portion is allowed to remain in the ideal region without receiving an I/O operation.

The threshold amount of time may be generally characterized as a function of the cost or burden to move data between the ideal and idle regions on that particular drive. In this case, a first drive classified as being a lower performance drive than a second drive may have a higher threshold amount of time than the second drive. For example, for a SATA 7.2K RPM drive type, data stored on the SATA drive may be considered idle if the data has not received an I/O operation in more than a week. For a higher performance 15K RPM FC drive, data stored on the FC drive may be considered idle if the data has not received an I/O operation for more than 3 days. If a data portion has not received an I/O operation within the threshold amount of time, the data portion may be classified as idle. Otherwise, the data portion may be classified as active. As described below, an embodiment may consider a data portion currently stored in the ideal region as a candidate for relocation to the idle region of the same physical drive or pool if there has been no I/O to the data portion for at least such a threshold amount of time thereby indicating that the data portion is classified as idle. In connection with discussion herein, the threshold amount of time indicating a threshold amount of time for which a data portion has not received an I/O operation may be referred to as the idle time threshold. If an amount of time that has elapsed since a data portion last received an I/O operation whereby the amount of time is equal to or greater than the idle time threshold, then the data portion may be classified as idle. If an amount of time that has elapsed since a data portion last received an I/O operation whereby the amount of time is less than the idle time threshold, then the data portion may be classified as active. As described herein, an idle time counter may be associated with a particular portion of the thin device's logical address space also referred to as a partition which may have any suitable level of granularity. In this case, the idle time counter for a partition may be associated with any data portion included in the partition's logical address space.

It should be noted that the inventors have also observed that generally, the total amount or total capacity of "active" data remains about the same over time whereas the total amount or total capacity of "idle" data tends to increase over time.

An embodiment may determine the idle time threshold in any suitable manner. For example, with reference to FIG. 21, in one embodiment, the histogram 1400 for a particular drive type or technology over time may be examined and used to determine the idle time threshold for that particular drive type or technology.

Figure 24:
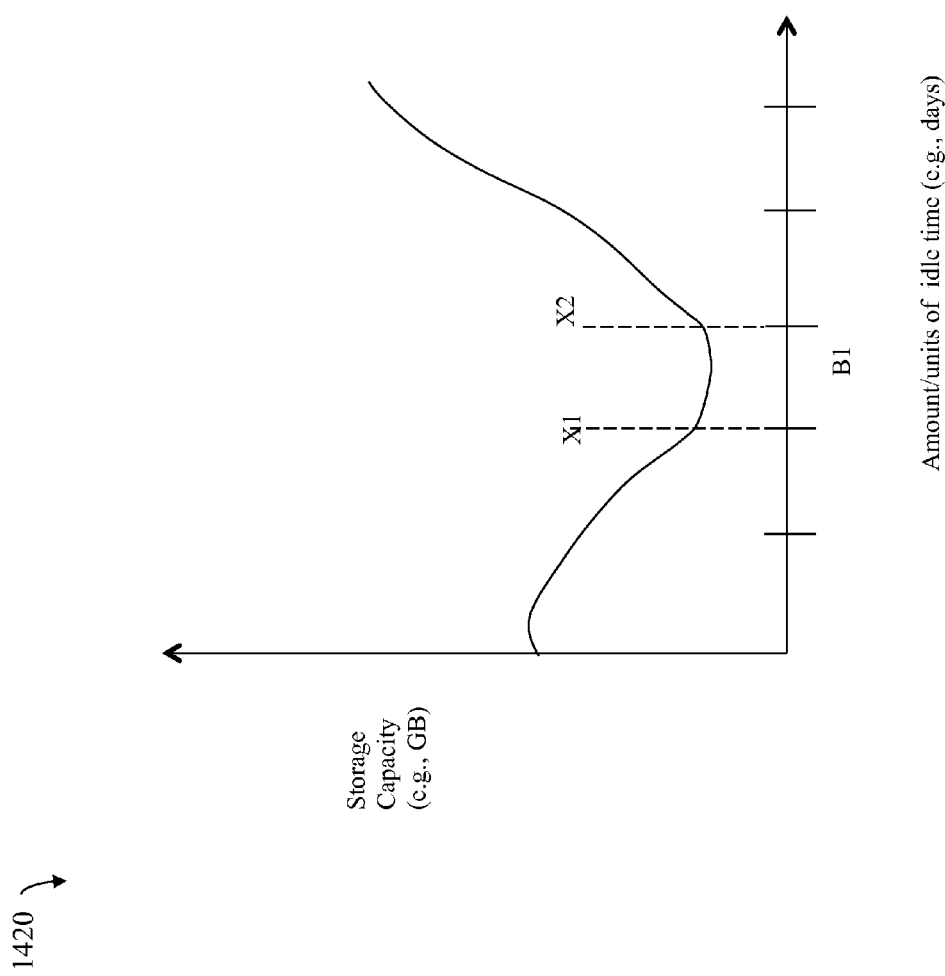
FIG. 24 is an example illustrating cumulative storage capacity for different amounts of idle time in an embodiment in accordance with techniques herein.

With reference to FIG. 24, the example 1420 may illustrate the general curve for a drive type or technology over time where, as in FIG. 21, the X axis denotes an amount of idle time or time since a last previous I/O is received at a partition and the Y axis denotes the total cumulative storage capacity of all partitions falling within a particular idle time bin. As mentioned above, the inventors have determined that over time, the distribution approximates a bimodal distribution such as generally illustrated in the examples 1400 and 1420. The histogram 4120 may have a particular idle time bin, such as bin B1, which includes the minimum storage capacity of all other idle time bins. That is bin B1 may include the smallest number of partitions and thus have the smallest relative capacity of all bins. Bin B1 may be used to determine the idle time threshold in an embodiment. Bin B1 represents an idle time range with a lower bound of X1 and an upper bound of less than X2. The idle time threshold may be selected X2, the upper bound associated with bin B1.

In connection with techniques herein, an embodiment may initially operate in a first mode when allocating storage from a physical device or a pool of one or more physical devices where all allocations are made from the ideal region until a threshold allocation limit has been reached. The threshold allocation limit may be expressed as a percentage thereby denoting a percentage of the total available storage drive capacity that has been consumed. For example, a threshold allocation limit of 35%, or other suitable limit, may be used in an embodiment. Once the threshold allocation limit has been reached, then subsequent allocations may be performed based on second allocation mode as described above such as in connection with FIGS. 19 and 20 where the allocation is made from either the ideal region or the idle region depending on the classification of the data portion to be stored in the allocated storage.

Additionally, an embodiment in accordance with techniques herein may perform processing to migrate "idle" data from the ideal to the idle region within the same physical drive, or with respect to physical drive(s) in the same pool, responsive to an occurrence of a trigger event based on one or more specified criteria. The idle time threshold may be used to determine data portions which are candidates for migration from the ideal region to the idle region of a drive or pool as those having an idle time counter greater than, or equal to, the idle time threshold (e.g., those data portions classified as idle based on the idle time threshold). If a data portion has not received an I/O operation for at least the amount of time denoted by the idle time threshold, then that data portion may be classified as idle and when such "idle" data portions are stored in the ideal region, processing may be performed to migrate at least some of the idle data portions from the ideal region of a drive to the idle region of the drive. For example, such migration may be performed responsive to the ideal region being consumed, or within some threshold amount thereof (e.g., where there is only 10% of the ideal region remaining free/unconsumed). As another example, such migration of idle data currently in the ideal region to the idle region may be performed responsive to performance criteria not being met for the drive (or pool level). For example, an embodiment may migrate "idle" data currently stored in the ideal region to the idle region if the observed average RT for an I/O operation directed to the drive is above a desired RT threshold. The data portions which are migration candidates may be selected using the histogram (e.g., such as in the example 1400 of FIG. 21) for the drive or pool starting with those having the highest idle time counters. For example, with reference to FIG. 21, data portions having an associated idle time counter falling within the bin indicating the largest idle time counter (e.g., bin I) may be candidates for movement from the ideal region to the idle region. If a data portion has an associated idle time counter falling within the largest idle time counter bin and the data portion is currently stored in the ideal region, the data portion may be moved from the ideal region to the idle region.

Generally, an embodiment may rank or order those data portions currently stored in the ideal region based on decreasing associated idle time counters. Those data portions having idle time counters which are above the idle time threshold may be considered as candidates for migration from the ideal region to the idle region. The candidates may be further considered in an order or ranking based on decreasing idle time counter as just described where a first data portion having a first associated idle time counter is considered as a candidate for movement from the ideal to the idle region before any other data portion having an associated idle time counter less than the first associated idle time counter of the first data portion. Thus, an embodiment may perform migration of idle data portions from the ideal region to the idle region with respect to a single physical drive or with respect to a storage pool including multiple drives as the expected level of activity for data portions stored in the ideal region may change over time.

Techniques may be used in an embodiment to bias caching behavior to help reduce the adverse impact upon performance in the event that an idle data portion, or data portion currently stored in the idle region becomes active (e.g., has an I/O directed to the data portion). Such cache biasing processing may be performed, for example, if the observed average RT for an I/O operation directed to the drive is above a desired RT threshold as described above as a trigger condition for determining when the migrate or relocate data from the ideal region to the idle region.

Any data portion stored in the idle region may be characterized as "at risk" in that if an I/O is directed to the data portion (thereby indicating that the data portion is now active and no longer idle), the RT (and more generally the performance) of the drive may be adversely impacted. If a data portion is in the idle region and an I/O operation is directed to the data portion, cache bias processing may be performed to bias the cache, and the cache bias processing may include the following as described below.

Cache bias processing may include performing first processing in connection with a read miss. For a read miss, additional data may be prefetched which is sequentially located in the thin device logical address space subsequent to the read miss data. In one embodiment, such prefetching of additional data may be performed by increasing the size or amount of the data read for the read miss to be, for example, the size of the thin device allocation unit. For example, a read operation may be received which is directed to a data portion stored in the idle region and results in a read miss. The read operation may request to read 8K bytes of data. In an embodiment, the size of the thin device allocation unit may be, for example 512K bytes and the amount of data read may be increased to be 512K bytes. Typically, the data that is read from the physical drive in response to a received read operation will be less than the size of the thin device allocation unit. An embodiment may increase the amount of data read for the read miss and then store such data in cache. In this manner, the cache may be biased to include other data (the additional prefeteched data) that is sequentially logically located in the thin device logical address space following the read miss data (e.g, both the read miss data and the prefetched data are physically stored in the same allocation unit of physical storage so that they are also physically stored near one another as well as logically located near one another in the thin device logical address space). Such prefetching may be performed based on a locality of reference presumption or heuristic that such additionally prefetched data may be requested in a subsequent read thereby avoiding a subsequent read miss since the prefetched data is already in cache and may be used to service the subsequent read. In the foregoing, both the read miss data and the additional prefetched data may be stored on the idle region of a disk drive.

Cache bias processing may include performing second processing. A data region may be defined which includes portions of the thin device LBA range for both the read miss data and also the additional prefetched data. The data region may map to the thin device's logical address space portion corresponding to that of the thin device allocation unit noted above. Per first processing of cache bias processing as described above (where the read miss data and the additional prefetched data are stored in cache), the data of the data region is stored in cache. While the data of the data region is in cache, the number of cache hits for subsequent I/Os directed to the data region are observed. If the total number of cache hits directed to the data region is greater than 1, then the data of the data region is relocated or migrated to an ideal region of a higher performance tier. For example, the data of the data region may be currently stored in an idle region of a SATA drive. Processing may be performed to now move or promote the data of the data region (both the data of the read miss and the additional prefetched data) from the idle region of the SATA drive to an ideal region of a higher performance drive, such as a rotating FC drive, or a flash drive (e.g., more generally SSD). Thus, cache bias processing may be used to initially bias the cache and then used to determine whether to relocate data from an idle region of one tier to an ideal region of a higher performance tier.

It should be noted that when relocating or migrating data in the second processing of the cache bias processing just described (e.g., to promote data by moving the data from the idle region of a first drive to an ideal region of a second drive of a higher performance tier than the first drive), the data being relocated is already stored in cache. In this manner, the relocation involves copying the data which is already stored in cache to the ideal region of the second drive (rather than have to retrieve the data from the first drive).

It should be noted that an embodiment may include both flash (e.g., SSD) and rotating disk drives. Although techniques herein benefit rotational disk drives, techniques herein may be also be used in connection with an embodiment that includes storage tiers of rotating disk drives and one or more storage tiers of SSDs.

In embodiment, a data portion stored a first tier may be demoted and relocated to a second lower performance tier. An embodiment may decide what data portion(s) to demote based on an idle time counter associated with a data portion. Criteria for demotion may include demoting data portions that are currently located in the first tier and which are also the least active (e.g., are idle and have the largest idle time counters) in the first tier to the second lower performing tier. The activity level may be determined using the idle time counters whereby the larger the idle time counter, the less active the data portion associated with the idle counter. Additionally, the data portion which is demoted from the first tier to the second lower performance tier may be placed in an ideal region or idle region of a drive of the second lower performance tier depending on whether the data portion is classified as idle or active (in accordance with the idle time counter and established idle time threshold). An embodiment may, for example, perform demotion from a first drive/pool of a first tier to a second drive/pool of a second lower performing tier for only data portions of the first drive/pool classified as idle and where such data portions have the largest idle time counters of all idle data in the first drive/pool.

It should be noted that in operation, as deallocations and movements are made from the ideal and idle regions of a physical drive, free or unallocated storage of the drive may become fragmented so that there are "holes" of unallocated storage amongst allocated storage portions. In such case, further allocations may be made from the ideal and idle regions, such as described in connection with FIG. 19, whereby the allocations may be made from any unallocated storage "holes".

Figure 25:
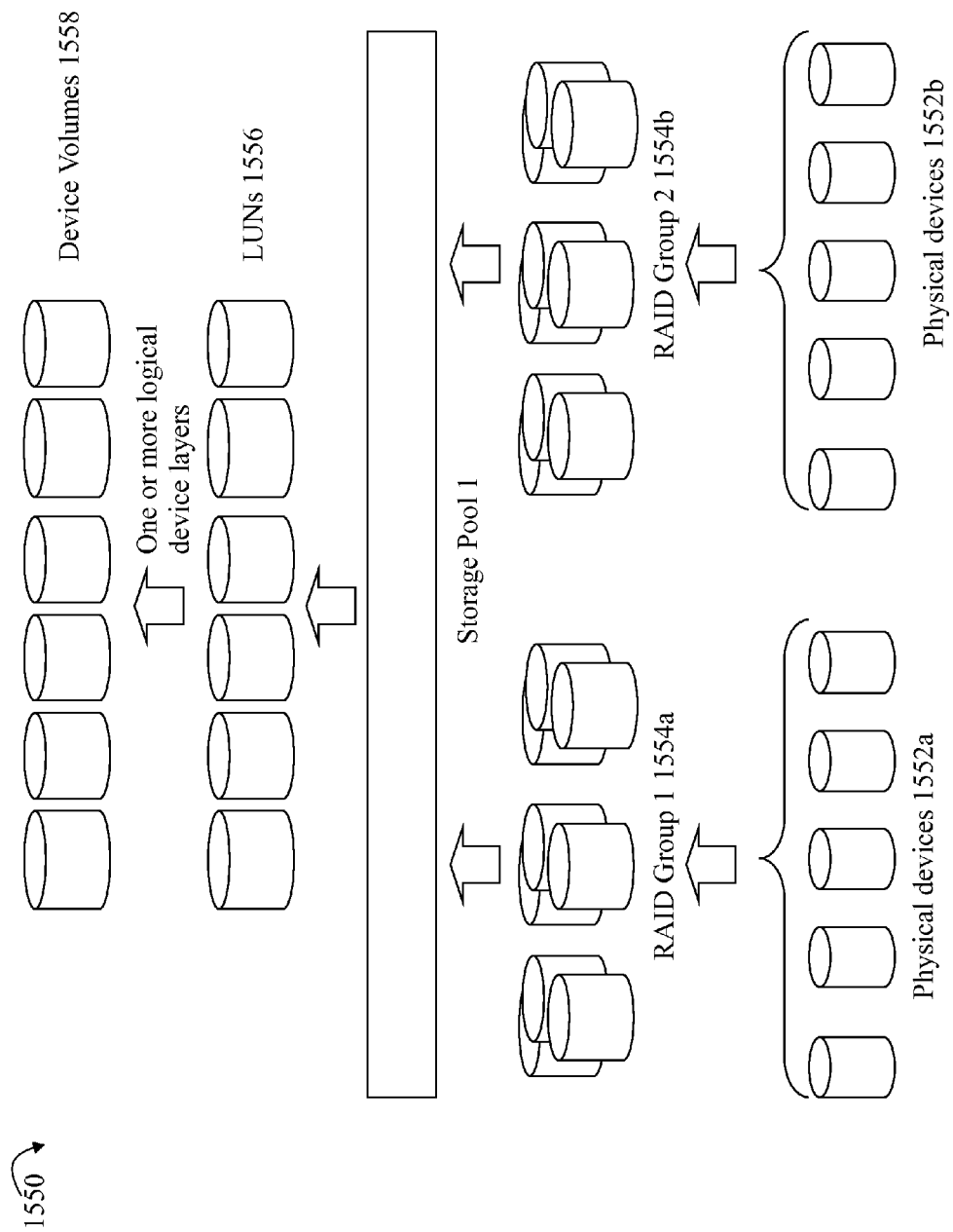
FIGS. 25 and 26 are examples illustrating formation of logical devices from configured storage pools of physical devices in an embodiment in accordance with techniques herein.

Referring to FIG. 25, shown is an example representing how storage pools may be formed from physical devices in an embodiment in accordance with techniques herein. The example 1550 illustrates how storage pools may be constructed from groups of physical devices. For example, RAID Group1 1554a may be formed from physical devices 1552a and RAID Group 2 1554b may be formed from physical devices 1552b whereby both RAID groups 1554a, 1554b form the storage pool 1. A storage pool may have a particular RAID level and RAID configuration or layout for the type of storage pool being formed. For example, for physical devices 1552a on a first data storage system type when forming a storage pool, RAID-5 may be used in a 4+1 configuration (i.e., 4 data drives and 1 parity drive for each 5 drives in the RAID group). The RAID groups 1554a, 1554b of the storage pool may be used to provide underlying provisioned storage for a number of data storage LUNs 1556. An embodiment may also utilize one or more additional logical device layers on top of the LUNs 1556 to form one or more logical device volumes 1558. The particular additional logical device layers used, if any, may vary with the data storage system. It should be noted that there may not be a 1-1 correspondence between the LUNs of 1556 and the volumes of 1558. The storage pool 1 of the example 1550 illustrates two RAID groups being used to define a single storage pool although, more generally, one or more RAID groups may be used to form a storage pool in an embodiment using RAID techniques.

In the example 1550, a data device may be configured as a logical device, such as represented by the LUNs at level 1556, from the pool of one or more RAID groups. A RAID group (RG) may be configured to include 4 PDs such as in a 3+1 RG configuration for RAID-5 (e.g., 3 data drives or member and 1 parity drive or member). Data devices, such as used with thin or virtually provisioned devices described herein, may be configured as logical devices with storage provisioned from the RG. In connection with techniques herein, a data device having storage provisioned from the RG may be configured to have storage provisioned from the same physical locations on each of the physical drives of the RG. This is to ensure that the data device has consistent performance across all drive members of the RG by having approximately the same seek distance across all drive members. It should be noted that an embodiment may allow for some minimal variance with respect to the physical location on each physical drive used for the same data device.

Figure 26:
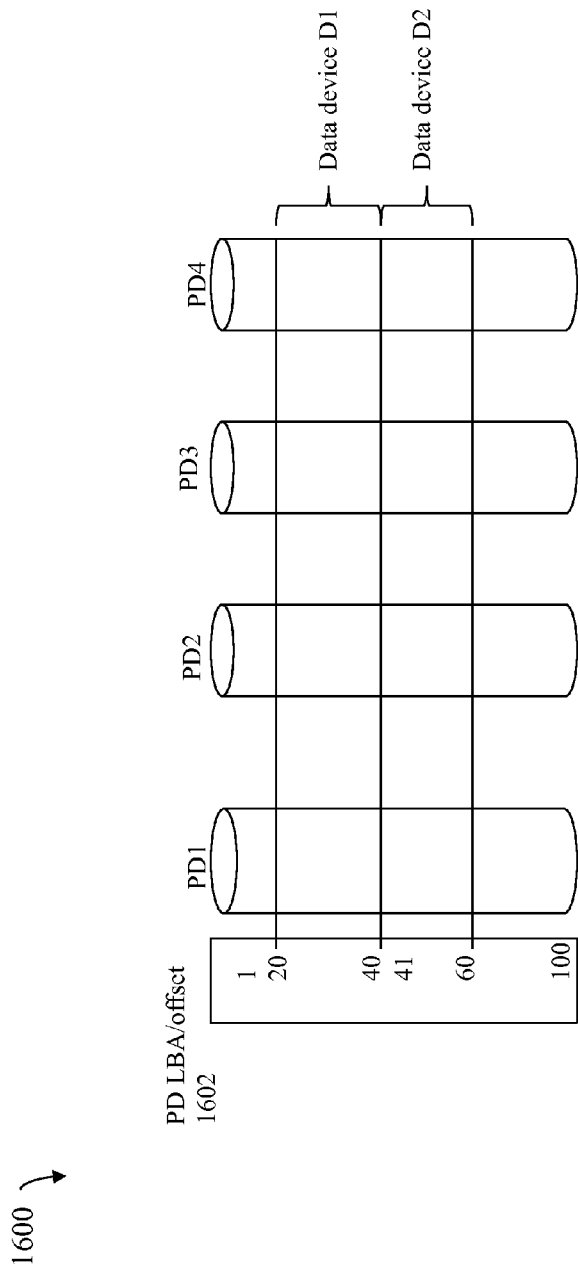

For example, reference is now made to FIG. 26 illustrating a RAID-5 3+1 RG configuration including 4 physical devices (PDs) denoted PD1, PD2, PD3 and PD4. Element 1602 may represent the LBA or offset on the PDs. A data device D1 may be configured to have storage provisioned from the PDs PD1-4 at LBA or offsets 20-40. A data device D2 may be configured to have storage provisioned from the PDs PD 1-4 at LBA or offsets 41-60. In this case, data device D1 is configured to have storage provisioned from ideal regions of the PDs1-4 and data device D2 is configured to have storage provisioned from idle regions of the PDs1-4. When allocating storage for data portions of a thin device, storage may be allocated from, or mapped to, data device D1 when such allocations are from the ideal region. Similarly, when allocating storage for data portions of a thin device, storage may be allocated from, or mapped to, data device D2 when such allocations are from the idle region. As illustrated, physical storage provisioned for each data device D1 and D2 may be at the same, or approximately the same, physical offset or location on each PD member of the RG. As noted above, an embodiment may allow a minimal amount of variance with respect to the physical location or offset on each PD drive member used in connection with storage provisioned for one of the data devices. It should be noted that when allocating storage for a data device, the provisioned storage may all be located within the ideal regions of all PDs, or otherwise all located within the idle regions of all PDs. In this manner, an embodiment may allocate storage for a data device for use with thin device or virtual provisioning which does not span across both the ideal region and the idle region of a single PD despite any allowable variation in physical location between RG PD members.

It should be noted that when allocating storage for thin device portions, the initial allocation may be made from a particular storage tier selected using any suitable technique. For example, if the embodiment is a multi-tiered system as described herein including 3 tiers, initial allocations may be made by default from the mid-level or lowest performance tier. The initial allocations may be based on a policy or preference, such as for a particular logical device.

In connection with a rotating disk drive, techniques herein may be utilized to provide a performance benefit while also utilizing more of the drive's capacity. Techniques herein take advantage of the fact that there is infrequently accessed data that can be migrated to, or stored on, the idle region of drives to reduce the seek length when accessing the active data in the ideal region. Additionally, when performance is not at an acceptable or desired level, an embodiment may also perform cache bias processing as described herein to further modify the caching behavior to allow for preferred treatment of "at risk" data stored in the idle region which may become active.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of storing data on disk drives comprising:
partitioning each disk drive platter of each of the disk drives into two separate regions, wherein a pivot point denoting a radial distance from the center of said each disk drive platter is a boundary partitioning said each disk drive platter into the two separate regions, wherein a first of the two separate regions of said each disk drive platter is an ideal region corresponding to an inner portion of said each disk drive platter spanning from an innermost cylinder of said each disk drive platter to the pivot point, and wherein a second of the two separate regions of said each disk drive platter is an idle region corresponding to an outer portion of said each disk drive platter spanning from the pivot point to an outermost cylinder of said each disk drive platter;
storing first data portions in the ideal region of a first of the disk drive platters of one of the disk drives spanning from an innermost cylinder of the first disk drive platter to the pivot point of the first disk drive platter; and
storing second data portions in the idle region of the first disk drive platter spanning from the pivot point of the first disk drive platter to the outermost cylinder of the first disk drive platter, wherein the first data portions are expected to be more frequently accessed than the second data portions.

2. The method of claim 1, wherein the pivot point of said each drive platter is selected such that approximately 40% of total storage capacity of said each disk drive platter is included in said ideal region and a remaining portion of the total storage capacity of said each disk drive platter is included in said idle region.

3. The method of claim 1, further comprising:
classifying a data portion in accordance with an expected activity level of said data portion; and
allocating storage for the data portion in one of the two separate regions of one of the disk drive platters of one of the disk drives in accordance with the expected activity level of said data portion and a defined allocation flow.

4. The method of claim 3, wherein the defined allocation flow for allocating storage from the ideal region allocates available storage from a physical location in the ideal region which is closest to the pivot point.

5. The method of claim 3, wherein the defined allocation flow for allocating storage from the idle region allocates available storage from a physical location in the idle region which is closest to the pivot point.

6. The method of claim 3, wherein the data portion is classified in said classifying as having an expected activity level that is any of active, idle and unknown.

7. The method of claim 6, wherein if the data portion is classified as having an expected activity level that is idle, storage for the data portion is allocated from the idle region.

8. The method of claim 7, wherein if the data portion is classified as having an expected activity level other than idle, storage for the data portion is allocated from the ideal region.

9. The method of claim 3, wherein the data portion is included in a virtually provisioned logical device.

10. The method of claim 9, wherein said allocating storage for the data portion is performed responsive to performing a write operation to write the data portion.

11. The method of claim 9, wherein the data portion is currently stored on a first of the disk drives of a first storage tier and said allocating storage for the data portion is performed responsive to promoting the data portion from the first storage tier to a second storage tier having a relative performance classification that is higher than the first storage tier, wherein said one of the disk drives from which storage is allocated for the data portion is included in the second storage tier.

12. The method of claim 9, wherein the data portion is currently stored on a first of the disk drives of a first storage tier and said allocating storage for the data portion is performed responsive to demoting the data portion from the first storage tier to a second storage tier having a relative performance classification that is lower than the first storage tier, wherein said one of the disk drives from which storage is allocated for the data portion is included in the second storage tier.

13. The method of claim 1, further comprising;
provisioning first storage for a first data device, said first storage including physical storage from only the first of the two separate regions of each of the plurality of disk drives;
provisioning second storage for a second data device, said second storage including physical storage from only the second of the two separate regions of each of the plurality of disk drives; and
allocating storage for a data portion located at a first logical address of a logical device from one of the first data device and the second data device in accordance with an expected activity level of said data portion, wherein the first logical address is mapped to a second logical address of the one of the first data device and the second data device.

14. The method of claim 13, wherein the plurality of disk drives are included in a RAID group.

15. The method of claim 13, wherein said provisioning first storage provisions storage from each of the plurality of disk drives at approximately a same physical location on a disk drive platter of each of the plurality of disk drives.

16. The method of claim 1, wherein each of the disk drives has an idle time threshold that varies in accordance with expected performance of said each disk drive, wherein a data portion stored in the ideal region of a disk drive platter of said each disk drive is considered a candidate for relocation to the idle region of a disk drive platter of one of the disk drives if the data portion has not received an I/O operation within a threshold amount of time denoted by the idle time threshold of said each disk drive.

17. The method of claim 1, wherein a first of the disk drives is a first drive type classified as a lower performance disk drive than a second of the disk drives that is a second drive type, wherein the first disk drive has a first idle time threshold that is higher than a second idle time threshold of the second disk drive, wherein one data portion stored in the ideal region of a drive platter of the first, disk drive is considered a candidate for relocation to the idle region of a disk drive platter of one, of the disk drives if the one data portion has not received an I/O operation within the first idle time threshold, and wherein another data portion stored in the ideal region of a drive platter of the second disk drive is considered a candidate for relocation to the idle region of a disk drive platter of one of the disk drives if the another data portion has not received an I/O operation within the second idle time threshold.

18. A data storage system comprising;
a plurality of disk drives wherein each disk drive platter of each of the plurality of disk drives is partitioned into two separate regions whereby a pivot point denoting a radial distance from the center of said each disk drive platter is a boundary partitioning said each disk drive platter into the two separate regions, wherein a first of the two separate regions of said each disk drive platter is an ideal region corresponding to an inner portion of said each disk drive platter spanning from an innermost cylinder of said each disk drive platter to the pivot point, and wherein a second of the two separate regions of said each disk drive platter is an idle region corresponding to an outer portion of said each disk drive platter spanning from the pivot point to an outermost cylinder of said each disk drive platter;
a processor; and
a memory comprising code that, when executed by the processor, performs a method comprising;
storing first data portions in the ideal region of a first of the disk drive platters of one of the plurality of disk drives spanning from an innermost cylinder of the first disk drive platter to the pivot point of the first disk drive platter, and
storing second data portions in the idle region of the first disk drive platter spanning from the pivot point of the first disk drive platter to the outermost cylinder of the first disk drive platter, wherein the first data portions are expected to be more frequently accessed than the second data portions.

19. A non-transitory computer readable medium comprising code stored thereon that, when executed, performs a method of storing data on disk drives comprising:
partitioning each disk drive platter of each of the disk drives into two separate regions, wherein a pivot point denoting a radial distance from the center of said each disk drive platter is a boundary partitioning said each disk drive platter into the two separate regions, wherein a first of the two separate regions of said each disk drive platter is an ideal region corresponding to an inner portion of said each disk drive platter spanning from an innermost cylinder of said each disk drive platter to the pivot point, and wherein a second of the two separate regions of said each disk drive platter is an idle region corresponding to an outer portion of said each disk drive platter spanning from the pivot point to an outermost cylinder of said each disk drive platter;

storing first data portions in the ideal region of a first of the disk drive platters of one of the disk drives spanning from an innermost cylinder of the first disk drive platter to the pivot point of the first disk drive platter; and storing second data portions in the idle region of the first disk drive platter spanning from the pivot point of the first disk drive platter to the outermost cylinder of the first disk drive platter, wherein the first data portions are expected to be more frequently accessed than the second data portions.

20. The non-transitory computer readable medium of claim 19, wherein the pivot point of said each drive planer is selected such that approximately 40% of total storage capacity of said each disk drive platter is included in said ideal region and a remaining portion of the total storage capacity of said each disk drive platter is included in said idle region.

21. The non-transitory computer readable medium of claim 19, wherein the method further comprises:

classifying a data portion in accordance with an expected activity level of said data portion; and allocating storage for the data portion in one of the two separate regions of one of the disk drive platters of one of the disk drives in accordance with the expected activity level of said data portion and a defined allocation flow.

* * * * *